United States Patent [19]
Honda et al.

[11] Patent Number: 6,041,195
[45] Date of Patent: Mar. 21, 2000

[54] CAMERA CAPABLE OF VIDEO AND FILM SHOOTING HAVING OPTICAL VIEWFINDER

[75] Inventors: Tsutomu Honda, Sakai; Hiroyuki Matsumoto, Wakayama; Tatsuya Suzuki, Kawachinagano, all of Japan

[73] Assignee: Minolta Co., Ltd., Osaka, Japan

[21] Appl. No.: 08/899,800

[22] Filed: Jul. 24, 1997

[30] Foreign Application Priority Data

Jul. 24, 1996 [JP] Japan ..................................... 8-194651
Jul. 24, 1996 [JP] Japan ..................................... 8-194657

[51] Int. Cl.[7] .......................... G03B 17/48; G03B 19/00; G03B 29/00
[52] U.S. Cl. .............................. 396/429; 396/386; 348/64
[58] Field of Search .................................... 396/373, 374, 396/385, 386, 429, 432; 348/64

[56] References Cited

U.S. PATENT DOCUMENTS 5,023,635 6/1991 Nealon ................................ 395/429 X

FOREIGN PATENT DOCUMENTS

| 1-133038 | 5/1989 | Japan . |
| 8-334829 | 12/1996 | Japan . |
| 9-22061 | 1/1997 | Japan . |
| 9-5840 | 1/1997 | Japan . |
| 9-5865 | 1/1997 | Japan . |
| 9-5866 | 1/1997 | Japan . |
| 9-43506 | 2/1997 | Japan . |
| 9-43669 | 2/1997 | Japan . |
| 9-43715 | 2/1997 | Japan . |
| 9-43716 | 2/1997 | Japan . |
| 9-43717 | 2/1997 | Japan . |
| 9-43718 | 2/1997 | Japan . |
| 9-49959 | 2/1997 | Japan . |

*Primary Examiner*—Howard B. Blankenship
*Attorney, Agent, or Firm*—Sidley & Austin

[57] ABSTRACT

A camera is capable of both silver-halide shooting, through which object images are recorded on silver-halide film, and video shooting, although its distance measurement device is placed substantially in the same way and its mirror box has substantially the same size as in ordinary single-lens reflex cameras. In this camera, a pellicle mirror splits the light flux having passed through a taking lens into a first light flux and a second light flux, and a rotatable mirror switches the subsequent path of the second light flux between the optical path for a third light flux and the optical path for a fourth light flux. The pellicle mirror, through its light flux splitting function, directs the first light flux to a silver-halide shooting system, and directs the second light flux to the rotatable mirror. The rotatable mirror, through its optical path switching function, either directs the third light flux to an optical viewfinder system, or directs the fourth light flux to a video shooting system.

7 Claims, 16 Drawing Sheets

CAMERA CAPABLE OF VIDEO AND FILM SHOOTING HAVING OPTICAL VIEWFINDER

BACKGROUND OF THE INVENTION

1. Field of the Invention

The present invention relates to a camera, and more particularly to a camera that is capable of both silver-halide shooting (recording of object images as pictures on silver-halide film) and video shooting (recording of object images as electronically reproducible moving and still pictures).

2. Description of the Prior Art

In general, video cameras are not capable of silver-halide shooting, and cameras based on silver-halide photography such as single-lens reflex cameras are not capable of video shooting. However, Japanese Laid-open Patent Application No. H1-133038 proposes a camera that is capable of both silver-halide shooting and video shooting. This camera, as shown in FIGS. 17A and 17B, is provided with a half mirror HM that can rotate 90° to change its position, so that the light flux having passed through the taking lens (not shown) is split by the half mirror HM into a reflected light flux and a transmitted light flux.

When the half mirror HM is in the position shown in FIG. 17A, the light flux reflected therefrom enters an optical viewfinder system F, whereas the light flux transmitted therethrough enters a silver-halide shooting system G. As a result, it is possible to perform silver-halide shooting while observing the object through the optical viewfinder system F. In contrast, when the half mirror HM is in the position shown in FIG. 17B, the light flux reflected therefrom enters a video shooting system V, whereas the light flux transmitted therethrough enters the silver-halide shooting system G. As a result, it is possible to perform both video shooting and silver-halide shooting while observing the object through an electronic viewfinder (not shown) incorporated in the video shooting system V. In this way, to achieve compatibility between silver-halide shooting and video shooting, the camera proposed in Japanese Laid-open Patent Application No. H1-133038 relies on the use of the half mirror HM, whose semitransparency makes it possible to split a light flux and whose rotation makes it possible to switch optical paths.

A disadvantage of the above-mentioned camera is that it does not allow free placement of a distance measurement device. In ordinary single-lens reflex cameras, a distance measurement device, which is essential to realize automatic focusing (AF), is placed above or below a mirror box. However, in the arrangement shown in FIGS. 17A and 17B, where the half mirror HM is rotatable, it is impractical to place the distance measurement device above or below the mirror box, because the presence of a drive mechanism for rotating the half mirror HM imposes various restrictions on the placement of the distance measurement device and of an AF mirror (which is needed to direct light to the distance measurement device), and because the driving of the AF mirror in such a situation requires a complex mechanism. Instead, if the distance measurement device is placed by the side of the mirror box, then the retraction of the AF mirror requires a complex mechanism and, in addition, it is difficult to secure space for the retracting motion of the AF mirror.

Another disadvantage of the above-mentioned camera is that it requires a relatively large mirror box. Ordinarily, single-lens reflex cameras are provided with a swing-up mirror with which to reflect totally the light flux having passed through the taking lens toward the viewfinder system. Usually, a small swing-up mirror will suffice for ordinary single-lens reflex cameras, since it is not necessary to use a large mirror simply to reflect the light flux toward the viewfinder. However, in the arrangement shown in FIG. 17A and 17B, where the light flux transmitted through the half mirror HM is used by the silver-halide shooting system G, a considerably large half mirror HM is required. This is because an unduly small half mirror HM may cause eclipse in the light flux directed to the silver-halide shooting system G, especially when a large-aperture interchangeable lens is used. Since the half mirror HM is rotated to switch optical paths, a larger half mirror HM requires a larger mirror box, which inevitably makes the camera as a whole accordingly larger.

SUMMARY OF THE INVENTION

An object of the present invention is to provide a camera that is capable of both silver-halide shooting and video shooting but that nevertheless allows its distance measurement device to be placed substantially in the same way and allows its mirror box to have substantially the same size as in ordinary single-lens reflex cameras.

To achieve the above object, according to the present invention, a camera is provided with a light flux splitting member for splitting a light flux having passed through a taking lens into a first light flux and a second light flux; a switching member for switching a subsequent path of said second light flux between a direction in which the second light flux continues to travel as a third light flux and another direction in which the second light flux continues to travel as a fourth light flux; a first shooting system that performs shooting by receiving one of said first, third, and fourth light flux; a second shooting system that performs shooting by receiving one of said first, third, and fourth light flux except the one that is directed to said first shooting system; and a viewfinder optical system that receives one of said first, third, and fourth light flux except the ones that are directed to said first and second shooting systems.

Alternatively, according to the present invention, a camera is provided with a switching member for switching a subsequent path of a light flux having passed through a taking lens between a direction in which the light flux continues to travel as a first light flux and another direction in which the light flux continues to travel as a second light flux; a light flux splitting member for splitting said second light flux into a third light flux and a fourth light flux; a first shooting system that performs shooting by receiving one of said first, third, and fourth light flux; a second shooting system that performs shooting by receiving one of said first, third, and fourth light flux except the one that is directed to said first shooting system; and a viewfinder optical system that receives one of said first, third, and fourth light flux except the ones that are directed to said first and second shooting systems.

Alternatively, according to the present invention, a camera is provided with a first switching member for switching a subsequent path of a light flux having passed through a taking lens between a direction in which the light flux continues to travel as a first light flux and another direction in which the light flux continues to travel as a second light flux; a second switching member for switching a subsequent path of said second light flux between a direction in which the second light flux continues to travel as a third light flux and another direction in which the second light flux continues to travel as a fourth light flux; a first shooting system that performs shooting by receiving one of said first, third, and fourth light flux; a second shooting system that performs shooting by receiving one of said first, third, and fourth light flux except the one that is directed to said first shooting system; and a viewfinder optical system that receives one of said first, third, and fourth light flux except the ones that are directed to said first and second shooting systems.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1A:
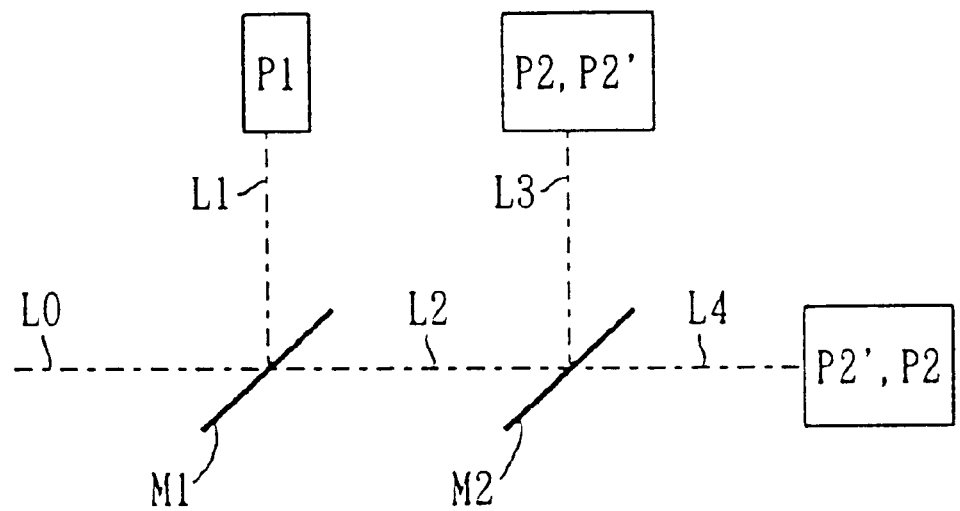
FIGS. 1A and 1B are optical path diagrams for explaining the basic constructions common to all embodiments of the present invention.

Hereinafter, cameras embodying the present invention will be described with reference to the drawings. Note that, in the following descriptions, the components that play the same or corresponding roles in different embodiments are identified with the same reference numerals or symbols, and overlapping descriptions will be omitted.

First, with reference to FIGS. 1A and 1B, a description will be given of mirrors M1 and M2 employed in cameras embodying the present invention and of their arrangement. The light flux L0 having passed through a taking lens (not shown) is manipulated first by a mirror M1 that is placed on the object side and then by another mirror M2 that is placed on the image side. Here, each of the mirrors M1 and M2 is used either as a light flux splitting means or as an optical path switching means. A mirror functioning as a light flux splitting means splits the incoming light flux into a light flux transmitted therethrough and a light flux reflected therefrom. A mirror functioning as an optical path switching means switches optical paths between a path which allows the incoming light flux to travel straight along its original path and a path which leads the incoming light flux to be reflected into a different path.

As the light flux splitting means, a fixed half mirror such as a pellicle mirror can be used. As the optical path switching means, a rotatable mirror of a type that can be rotated through a predetermined angle (such as a total-reflection mirror, a whole-surface half mirror, and a partial half mirror). It is also possible to use, as the light flux splitting means, a prism with a semitransparent reflecting surface, and, as the optical path switching means, a rotatable prism with a reflecting surface whose inclination is variable. In cases where the light flux splitting means and the optical path switching means are realized with prisms, those prisms may be used also as parts of an inverting optical system.

By the use of an optical system that is provided with two such mirrors M1 and M2, the light flux having passed through the taking lens can be extracted at three positions along the optical path, and thus can be directed to three different systems. In addition, since the mirrors M1 and M2 each function either as a light flux splitting means or as an optical path switching means, three types of light flux can be obtained, i.e. a reflected light flux, a transmitted light flux, and a direct light flux (neither reflected nor transmitted). Accordingly, from the viewpoint of the light flux splitting and optical path switching functions of those mirrors M1 and M2 (i.e. if factors such as image inversion and light flux reflection direction are disregarded), there are two ways of arranging the two mirrors M1 and M2 as shown in FIGS. 1A and 1B, respectively.

When the mirrors M1 and M2 are arranged as shown in FIG. 1A, they function as follows. If the mirror M1 is a light flux splitting means, part of the light flux L0 having passed through the taking lens is reflected (light flux L1) by the mirror M1 and travels to system P1, and the rest is transmitted (light flux L2) through the mirror M1 and travels to the mirror M2. If the mirror M1 is an optical path switching means, the light flux L0 having passed through the taking lens is either reflected (light flux L1) by the mirror M1 and travels to system P1, or, without being manipulated by the mirror M1, allowed to travel directly (light flux L2) to the mirror M2. If the mirror M2 is a light flux splitting means, part of the light flux L2 having entered the mirror M2 is reflected (light flux L3) by the mirror M2 and travels to system P2 or P2', and the rest is transmitted (light flux L4) through the mirror M2 and travels to system P2' or P2. If the mirror M2 is an optical path switching means, the light flux L2 having entered the mirror M2 is either reflected (light flux L3) by the mirror M2 and travels to system P2 or P2', or, without being manipulated by the mirror M2, allowed to travel directly (light flux L4) to system P2' or P2.

Figure 1B:
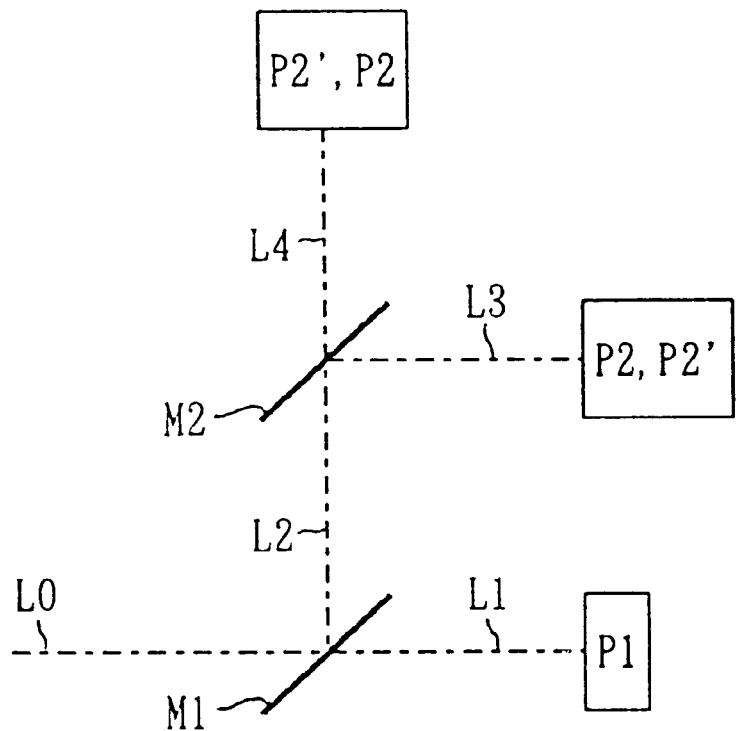

When the mirrors M1 and M2 are arranged as shown in FIG. 1B, they function as follows. If the mirror M1 is a light flux splitting means, part of the light flux L0 having passed through the taking lens is reflected (light flux L2) by the mirror M1 and travels to the mirror M2, and the rest is transmitted (light flux L1) through the mirror M1 and travels to system P1. If the mirror M1 is an optical path switching means, the light flux L0 having passed through the taking lens is either reflected (light flux L2) by the mirror M1 and travels to the mirror M2, or, without being manipulated by the mirror M1, allowed to travel directly (light flux L1) to system P1. If the mirror M2 is a light flux splitting means, part of the light flux L2 having entered the mirror M2 is reflected (light flux L3) by the mirror M2 and travels to system P2 or P2', and the rest is transmitted (light flux L4) through the mirror M2 and travels to system P2' or P2. If the mirror M2 is an optical path switching means, the light flux L2 having entered the mirror M2 is either reflected (light flux L3) by the mirror M2 and travels to system P2 or P2', or, without being manipulated by the mirror M2, allowed to travel directly (light flux L4) to system P2' or P2.

From the above explanation, it will be understood that the arrangements shown in FIGS. 1A and 1B allow different combinations of types of light flux to be obtained from the mirrors M1 and M2. Nevertheless, these two arrangements are basically the same in that they both form additional optical paths by splitting a light flux and by switching optical paths. In this way, the light flux L0 having passed through the taking lens is extracted out of an optical system along three different optical paths (as light flux L1, L3, and L4) so as to be directed to three different systems.

Figure 2:
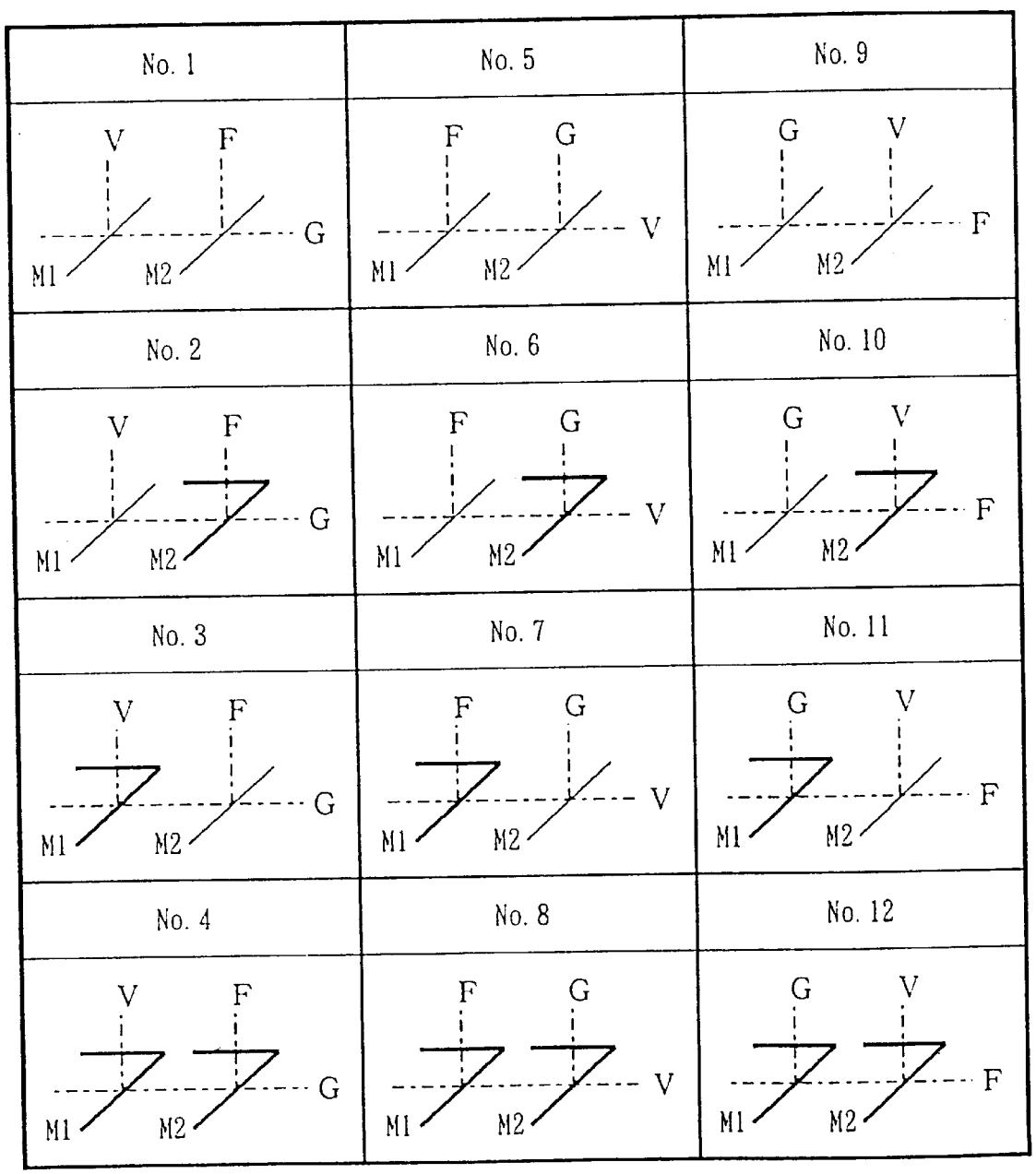
FIG. 2 is a set of optical path diagrams showing the basic constructions common to all embodiments of the present invention.

Next, a description will be given of the basic constructions and related features of cameras of the present invention. Here, we take for example a case where the mirror arrangement in FIG. 1A is used to split a light flux into three parts L1, L3, and L4 for use in three different systems. More specifically, the three systems are a silver-halide shooting system G that directs the incoming light flux to a light-sensitive recording medium (such as silver-halide film), a video shooting system V that has an image-sensing device at the position where the incoming light flux forms an image, and an optical viewfinder system F that directs the incoming light flux to the camera user's eye. Possible combinations of the mirrors M1 and M2 and the systems G, V, and F are listed in Table 1 together with their respective functional features. The constructions corresponding to the combinations listed in Table 1 are schematically shown in FIG. 2.

In FIGS. 1A and 1B, even if systems P2 and P2' are interchanged, it does not affect the functioning of the mirrors M1 and M2 as light flux splitting and/or optical path switching means. Accordingly, there are three possible ways of arranging the three systems G, V, and F. On the other hand, since each of the mirrors M1 and M2 may function either as a light flux splitting means or as an optical path switching means, there are four possible ways of combining the mirrors M1 and M2. In total, therefore, an optical system including two mirrors M1 and M2 can be realized in one of 12 possible constructions that are listed in Table 1 and shown in FIG. 2 as construction types Nos. 1 to 12. As noted previously, the arrangements in FIG. 1A and 1B are basically the same in that they both serve to form additional optical paths along which parts of a light flux L0 are extracted out of an optical system so as to be directed to three different systems G, V, and F. Accordingly, construction types Nos. 1 to 12 should be regarded as including also constructions in which the mirrors M1 and M2 are arranged as shown in FIG. 1B.

In types Nos. 1, 5, and 9, the mirror M1 functions as a first light flux splitting means, and the mirror M2 functions as a second light flux splitting means. The mirror M1 splits the light flux L0 having passed through the taking lens into a first light flux L1 and a second light flux L2. As a result, one of the silver-halide shooting system G, the video shooting system V, and the optical viewfinder system F receives the first light flux L1, and the mirror M2 receives the second light flux L2. The mirror M2 splits the second light flux L2 into a third light flux L3 and a fourth light flux L4. As a result, of the systems that do not receive the first light flux L1, one receives the third light flux L3, and the other receives the fourth light flux L4.

In types Nos. 2, 6, and 10, the mirror M1 functions as a light flux splitting means, whereas the mirror M2 functions as an optical path switching means. The mirror M1 splits the light flux L0 having passed through the taking lens into a first light flux L1 and a second light flux L2. As a result, one of the silver-halide shooting system G, the video shooting system V, and the optical viewfinder system F receives the first light flux L1, and the mirror M2 receives the second light flux L2. The mirror M2 switches the subsequent optical path of the second light flux L2 between the optical path for a third light flux L3 and the optical path for a fourth light flux L4. As a result, of the systems that do not receive the first light flux L1, one receives the third light flux L3, or alternatively the other receives the fourth light flux L4.

In types Nos. 3, 7, and 11, the mirror M1 functions as an optical path switching means, whereas the mirror M2 functions as a light flux splitting means. The mirror M1 switches the subsequent optical path of the light flux L0 having passed through the taking lens between the optical path for a first light flux L1 and the optical path for a second light flux L2. As a result, one of the silver-halide shooting system G, the video shooting system V, and the optical viewfinder system F receives the first light flux L1, or alternatively the mirror M2 receives the second light flux L2. The mirror M2 splits the second light flux L2 into a third light flux L3 and a fourth light flux L4. As a result, of the systems that do not receive the first light flux L1, one receives the third light flux L3, and the other receives the fourth light flux L4.

In types Nos. 4, 8, and 12, the mirror M1 functions as a first optical path switching means, and the mirror M2 functions as a second optical path switching means. The mirror M1 switches the subsequent optical path of the light flux L0 having passed through the taking lens between the optical path for a first light flux L1 and the optical path for a second light flux L2. As a result, one of the silver-halide shooting system G, the video shooting system V, and the optical viewfinder system F receives the first light flux L1, or alternatively the mirror M2 receives the second light flux L2. The mirror M2 switches the subsequent optical path of the second light flux L2 between the optical path for a third light flux L3 and the optical path for a fourth light flux L4. As a result, of the systems that do not receive the first light flux L1, one receives the third light flux L3, or alternatively the other receives the fourth light flux L4.

In the "Light Amount" column of Table 1, the symbols "o" and "x" have the following meanings:

o: the systems G, V, and F each receive a sufficient amount of light;

x: the systems G, V, and F each receive an insufficient amount of light.

As seen from Table 1, types Nos. 1, 5, and 9 suffer from shortage of light. In these types, the mirrors M1 and M2 both function as a light flux splitting means, so that all the systems G, V, and F receive a light flux concurrently. This, however, reduces the amount of light received by each of the systems G, V, and F to such an extent that they can no longer function properly.

This disadvantage of combining two light flux splitting means as the mirrors M1 and M2 can be explained as follows. For example, in type No. 9, 60% of the light flux L0 needs to be distributed to the silver-halide shooting system G, because about that amount of light is absolutely necessary there to cope with hand shakes properly. Further, 27.5% of the light flux L0 needs to be distributed to the optical viewfinder system F, because a smaller amount of light there makes the viewfinder image too dim to be observed clearly. Under this condition, even if the camera is fitted with a taking lens having an f-number of 5.6, the obtained viewfinder image is as dim as when the camera is fitted with a taking lens having an f-number of 11 (on the assumption that 100% of the light flux L0 is distributed to the optical viewfinder system F). Now that 87.5% of the light flux L0 is already distributed to the systems G and F, only 12.5% can be distributed to the video shooting system V. However, with only 12.5% of the light flux F0 distributed to the video shooting system V, even if the video shooting system V incorporates a relay lens (not shown) having an f-number of 2, the image obtained there is as dim as when it incorporates a relay lens having an f-number of 5.6 (on the assumption that 100% of the light flux L0 is distributed to the video shooting system V). Under this condition, video shooting is simply impossible, because the image there needs to be at least as bright as when a relay lens having an f-number of about 3.5 is used, even under the condition that the image-sensing device (such as a CCD (charge coupled device)) has a sensitivity of the highest practicable order.

On the other hand, in type No. 1, 33% of the light flux L0 needs to be distributed to the video shooting system V. Under this condition, even if the video shooting system V incorporates a relay lens having an f-number of 2, the image obtained there is as dim as when it incorporates a relay lens having an f-number of 3.5 (on the assumption that 100% of the light flux L0 is distributed to the video shooting system V). Of the remaining 67%, 27.5% is distributed to the optical viewfinder system F, just as in type No. 9 discussed above. Now that 60.5% of the light flux L0 is already distributed to the systems V and F, only 39.5% can be distributed to the silver-halide shooting system G. However, with only 39.5% of the light flux F0 distributed to the silver-halide shooting system G, even if the camera is fitted with a taking lens having an f-number of 5.6, the image obtained in the silver-halide shooting system G is as dim as when the camera is fitted with a taking lens having an f-number of 9.0 (on the assumption that 100% of the light flux L0 is distributed to the silver-halide shooting system G). Under this condition, the camera is excessively susceptible to hand shakes.

As described above, since types No. 1, 5, and 9 suffer from shortage of light, these types are not fit for practical applications. For this reason, a first embodiment of the present invention adopts type No. 2, 6, or 10, a second embodiment adopts type No. 3, 7, or 11, and a third embodiment adopts type No. 4, 8, or 12. In types Nos. 2, 6, and 10, two among the video shooting system V, the optical viewfinder system F, and the silver-halide shooting system G receive a light flux at a time. In types Nos. 3, 7, and 11, one or two among the video shooting system V, the optical viewfinder system F, and the silver-halide shooting system G receive a light flux at a time. In types Nos. 4, 8, and 12, only one among the video shooting system V, the optical viewfinder system F, and the silver-halide shooting system G receives a light flux at a time. In these types, since it never happens that all of the three systems receive a light flux at a time, each of them can receive a sufficient amount of light to function properly. Still, these types allow the three systems to be used in various combinations, and thus allow shooting to be performed in various modes as described below.

In the "Simultaneous Use of Systems" column of Table 1, the symbols "○" and "x" have the following meanings:

○: two systems (V and G, F and V, or F and G) can be used concurrently;

x: two systems (V and G, F and V, or F and G) cannot be used concurrently.

Note that, although types Nos. 1, 5, and 9 allow concurrent use of the three systems, these types will not be dealt with further, since they suffer from shortage of light.

When a light flux can be directed to both the video shooting system V and the silver-halide shooting system G at a time, these two systems can be used concurrently. This makes it possible to perform silver-halide shooting and video shooting concurrently (i.e. to take a silver-halide shot during video shooting, and to take a video still picture and a silver-halide shot simultaneously). Such concurrent use of the video shooting system V and the silver-halide shooting system G is possible in types Nos. 2, 7, 10, but not in types Nos. 3, 4, 6, 8, 11, and 12. This is because the types of the latter group switch between the path leading to the video shooting system V and the path leading to the silver-halide shooting system G. Moreover, simultaneous shooting of a video still picture and a silver-halide shot makes it possible to realize a release-view function as described later.

When a light flux can be directed to both the optical viewfinder system F and the video shooting system V at a time, these two systems can be used concurrently. This makes it possible to perform video shooting (i.e. shooting of moving and still pictures by video) while observing the object through the optical viewfinder system F. During such video shooting, it is unnecessary to keep in operation a monitor device such as an electronic viewfinder (hereinafter referred to as an EVF) including a liquid crystal display device provided in the video shooting system V for monitoring the object image and reproduced images, or a personal computer connected to the video shooting system V. As a result, video shooting can be performed with less electric power consumption (power-saving video shooting). Such concurrent use of the optical viewfinder system F and the video shooting system V is possible in types Nos. 2, 6, 11, but not in types Nos. 3, 4, 7, 8, 10, and 12. This is because the types of the latter group switch between the path leading to the optical viewfinder system F and the path leading to the video shooting system V.

When a light flux can be directed to both the optical viewfinder system F and the silver-halide shooting system G at a time, these two systems can be used concurrently. This makes it possible to perform silver-halide shooting while observing the object through the optical viewfinder system F. During such silver-halide shooting, it is unnecessary to keep in operation the video circuitry (including the monitor device) incorporated in the video shooting system V, and this helps reduce electric power consumption. As a result, silver-halide shooting can be performed with less electric power consumption (power-saving silver-halide shooting). Moreover, quite advantageously, the optical viewfinder system F is free from blackouts. Such concurrent use of the optical viewfinder system F and the silver-halide shooting system G is possible in types Nos. 3, 6, 10, but not in types Nos. 2, 4, 7, 8, 11, and 12. This is because the types of the latter group switch between the path leading to the optical viewfinder system F and the path leading to the silver-halide shooting system G.

In the "Focusing Screen" column of Table 1, the symbols "○" and "Δ" have the following meanings:

○: it is possible to place an ordinary focusing screen on the primary image plane (here, an ordinary focusing screen is one whose dispersion characteristics are invariable and which therefore disperses light rays at all times);

Δ: it is possible to place a focusing screen on the primary image plane only if the focusing screen is not an ordinary one but one made of a liquid crystal dispersion plate, and it is possible to place an ordinary focusing screen on the secondary image plane.

If a focusing screen can be placed on an image plane, it is possible to adjust focus manually while observing the object through the optical viewfinder system F, without the help of the AF function.

In types Nos. 1 to 4, where the video shooting system V receives light from the mirror M1, if a focusing screen is placed on the primary image plane formed at a film-surface-equivalent position closest to the optical viewfinder system F, the video shooting system V is not affected by the placement of the focusing screen. In types Nos. 5 to 8, where the optical viewfinder system F receives light from the mirror M1, if a focusing screen is placed on the primary image plane formed at a film-surface-equivalent position closest to the optical viewfinder system F, the video shooting system V is not affected by the placement of the focusing screen. Accordingly, in types Nos. 1 to 8, an ordinary focusing screen can be placed without any problem on the primary image plane, that is, at a position equivalent to the position of the film surface (image plane) of the silver-halide shooting system G.

In contrast, in types Nos. 9 to 12, where the silver-halide shooting system G receives light from the mirror M1, the primary image plane is formed at a film-surface-equivalent position between the mirrors MI and M2. In this case, since the video shooting system V is placed at the position of system P2 or P2' in FIGS. 1A and 1B, if an ordinary focusing screen is placed on the primary image plane, it scatters the light rays traveling toward the video shooting system V. To prevent this from affecting the video shooting system V, it is necessary to use a focusing screen made of a liquid crystal dispersion plate (i.e. a dispersion plate whose dispersion characteristics vary with the voltage applied thereto), or to place an ordinary focusing screen on the secondary image plane. Since the secondary image plane is formed between the mirror M2 and the optical viewfinder system F, the video shooting system V is not affected by the placement of an ordinary focusing screen on the secondary image plane.

In cameras in which an optical system provided with two mirrors M1 and M2 is employed, as in types No. 1 to 12 above, optical paths can be manipulated partly by one mirror M1 and partly by the other mirror M2. This makes it possible to use different mirrors for different purposes, i.e. a fixed half mirror is used for light flux splitting, whereas a rotatable mirror that is rotatable through approximately 45°, such as used in ordinary single-lens reflex cameras, is used for optical path switching. Such combination of two mirrors alleviates restrictions on the placement of the distance measurement device and the AF mirror (for directing light to the distance measurement device) for automatic focusing, and thus allows them to be placed in much the same way as in ordinary single-lens reflex cameras. Moreover, as long as the mirror used to split a light flux is of a fixed type, or the mirror used to switch optical paths is of a rotatable type, there is no need to provide a larger mirror box. This makes it possible to achieve compatibility between silver-halide shooting and video shooting by the use of a mirror box that is not much larger than those used in ordinary single-reflex cameras.

In cameras in which the light flux L0 having passed through the taking lens is manipulated, as in types No. 1 to 12 above, light flux splitting and optical path switching can be done within the camera body. A construction in which light flux splitting and optical path switching are done within the taking lens has disadvantages that the taking lens needs to be larger and more complex (e.g. an image-sensing device needs to be fitted on the outer surface of the lens barrel of an interchangeable lens), and that focusing is affected by manipulation of optical paths. In contrast, a construction in which light flux splitting and optical path switching are done within the camera body allows the use of an ordinary taking lens, that is, one of ordinary interchangeable lenses (e.g. readily available interchangeable lenses for the 135 format).

One particularly preferable construction is type No. 10, in which the mirror M1 functioning as a light flux splitting means directs the first light flux L1 to the silver-halide shooting system G, and the mirror M2 functioning as an optical path switching means either directs the third light flux L3 to the optical viewfinder system F or directs the fourth light flux L4 to the video shooting system V. Another particularly preferable construction is type No. 2, in which the mirror M1 functioning as a light flux splitting means directs the first light flux L1 to the video shooting system V, and the mirror M2 functioning as an optical path switching means either directs the third light flux L3 to the silver-halide shooting system G or directs the fourth light flux L4 to the optical viewfinder system F. The reasons are as follows.

Types Nos. 2 and 10 allow concurrent use of the silver-halide shooting system G and the video shooting system V. This means that, in these types, it is possible to take silver-halide shots while shooting a video moving picture, and to take a silver-halide shot and a video still picture simultaneously. Moreover, if a quick-return mirror is used as the mirror M2, even during power-saving silver-halide shooting, in which the video circuitry is kept inactive while the object is merely being observed, it is possible to provide so-called "release-views", that is, to permit the user to confirm a shot (e.g. a video still picture corresponding to the silver-halide shot taken at the same time) on the monitor device immediately after the shot is taken. This is convenient, for example, in the Advanced Photo System (APS), which allows various specifications, such as which shots are to be printed and how many prints of each shot are required, to be made before a silver-halide film is developed. There, release-views enable the user to make such specifications while confirming a shot on the monitor device just after the shot is taken. In addition, it is also possible to provide so-called "after-views", that is, to permit the user to store video still pictures in memory or the like so that they can be viewed afterwards when necessary.

In type No. 10, as described previously, it is not possible to place an ordinary focusing screen on the primary image plane (Table 1). However, it is possible either to place a focusing screen made of a liquid crystal dispersion plate on the primary image plane (i.e. place a liquid crystal plate whose dispersion characteristics vary with the voltage applied thereto on the primary image plane of the second light flux L2), or to place an ordinary focusing screen on the secondary image plane (of the fourth light flux L4). This prevents the light rays traveling toward the video shooting system V from being scattered by the focusing screen, and, as a result, minimizes degradation of the video picture quality due to the insertion of the focusing screen, and, in addition, makes it possible to adjust focus manually while observing the object through the optical viewfinder system F. In type No. 2, as described previously, it is possible to place an ordinary focusing screen on the primary image plane that is formed at a film-surface-equivalent position closest to the optical viewfinder system F (Table 1). This is because, since the video shooting system V receives light from the mirror M1, it is not affected by the focusing screen. As a result, manual focus adjustment is possible with the same placement of the focusing screen as in ordinary single-lens reflex cameras.

Considering the amount of light needed in each system, it is preferable that 50 to 70% of the light flux L0 be distributed to the silver-halide shooting system G, and that 30 to 50% be distributed to the video shooting system V. Specifically, in type No. 10, it is preferable that the mirror M1 distribute 50 to 70% of the light flux L0 to the silver-halide shooting system G, and, in type No. 2, it is preferable that the mirror M1 distribute 30 to 50% of the light flux L0 to the video shooting system V. Ideally, as much light as possible should be distributed to the silver-halide shooting system G, since its susceptibility to hand shakes depends on how much light it receives. However, if an excessively large proportion of light is distributed to the silver-halide shooting system G, the optical viewfinder system F yields unduly dim images, or the video shooting system V yields unacceptably dim images under poor light conditions. Since, other things being equal, a drop in shutter speed that is equivalent to 0.5 to 1.0 EV is the acceptable maximum, distributing light in other proportions than are noted above causes, in types Nos. 10 and 2, excessive susceptibility to hand shakes, unduly dim viewfinder images, and unacceptably dim video images under poor light conditions. To obtain satisfactorily bright images through the optical viewfinder system F, it is preferable that 30 to 50% of the light flux L0 be distributed to it.

Prior to detailed descriptions of five embodiments of the present invention, a description will be given of their external appearances.

Figure 3:
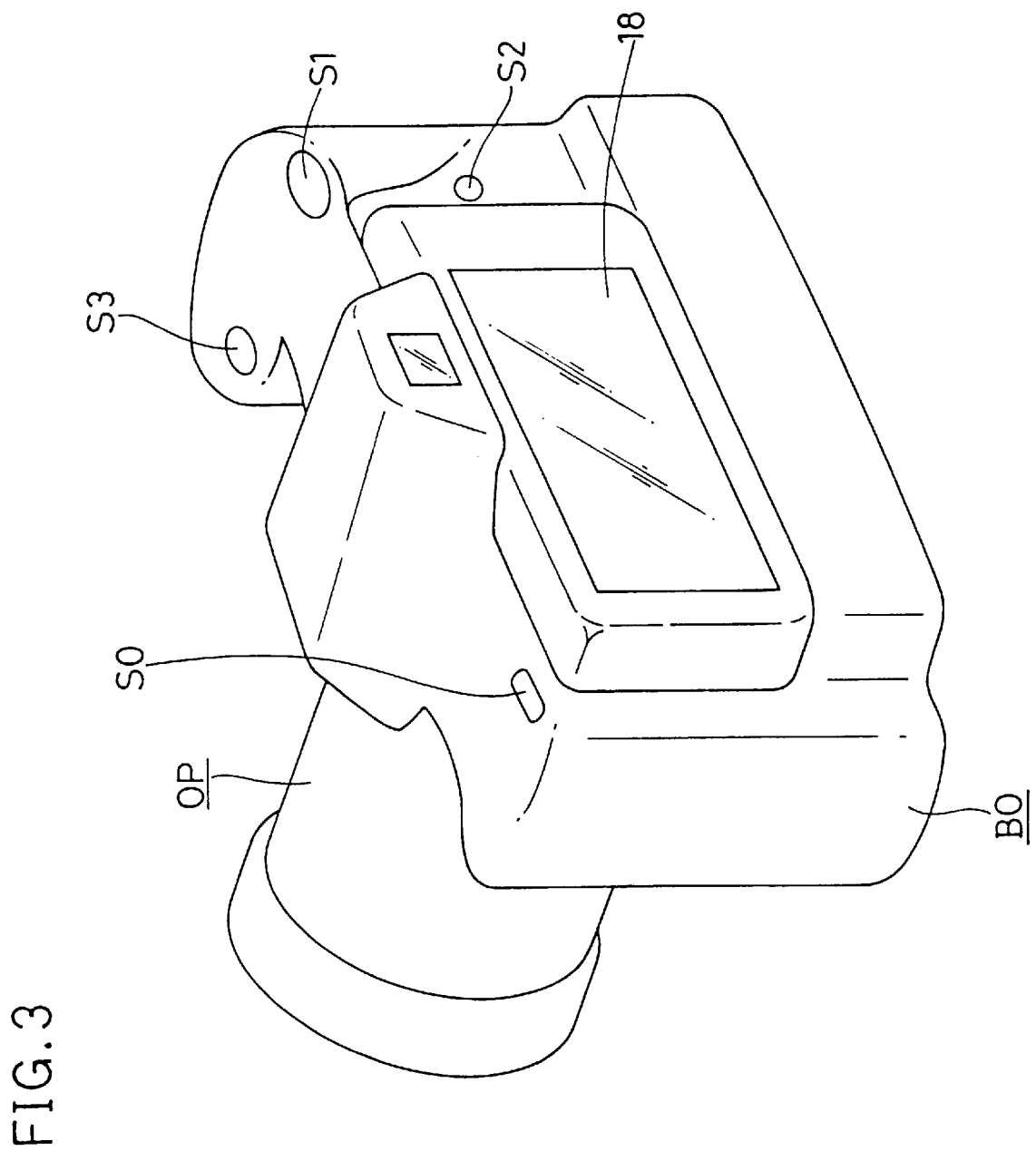
FIG. 3 is a perspective view of the first, third, and fourth embodiments, showing their appearance as seen obliquely from the top-rear side.

FIG. 3 shows the external appearance, as seen from the rear, of the cameras of the first, third, and fourth embodiments. The cameras of the first to fifth embodiments are all composed of a camera body BO and a lens barrel OP. The lens barrel OP houses a taking lens TL including an aperture diaphragm AP.

As shown in FIG. 3, in the first, third, and fourth embodiments, an EVF 18 is provided as a monitor device on the rear surface of the camera body BO. The camera body BO is further provided with a recording control operation unit, which includes a shooting mode button S0, a video button S1, a still-picture button S2, and a shutter release button S3 for silver-halide shooting. Though not shown in the figure, a playback control operation unit and other components are also provided on the camera body BO.

In the second and fifth embodiments, instead of the EVF 18, a connector 20 (FIGS. 5 and 8) is provided in a removable viewfinder/video unit RFV, which will be described later. By the use of this connector 20, the camera can be connected to a personal computer (PC) 21 that is in turn connected to a PC monitor 22, in which case the PC monitor 22 serves as a monitor device for the camera. The cameras of the second and fifth embodiments have the same appearance as those of the first, third, and fourth embodiments, except that, in the second and fifth embodiment, in which the PC monitor 22 substitutes for the EVF 18 as a monitor device, the buttons S0 to S2 are not provided on the camera body BO. Instead, the shooting mode button S0 is provided on the removable viewfinder/video unit RFV, and the functions of the video button S1 and the still-picture button S2 are realized through operation of the personal computer 21. The functions of these buttons S0 to S2 may also be realized through button operation on the removable viewfinder/video unit RFV, or through operation of a release cable connected thereto.

The functions of the buttons S0 to S3 (or the equivalent operations) are as follows. As to the shooting mode button S0, every time it is operated, the shooting mode is switched cyclically, and the camera is brought into a standby (ready-for shooting) state for that mode. At this time, if the selected shooting mode uses the EVF 18 for object observation, the object image is displayed on the EVF 18.

Since video shooting allows both moving-picture and still-picture shooting, the video button S1 and the still-picture button S2 are provided separately. The video button S1 is operated, in the standby state of a shooting mode that allows shooting of a video moving picture, to start operations for shooting a moving picture, and, in the middle of moving-picture shooting, to stop those operations. The still-picture button S2 is operated, in the standby state of a shooting mode that allows shooting of a video still picture, to perform operations for shooting a still picture. The shutter release button S3 is operated, in a mode that allows silver-halide shooting, to perform operations for shooting a silver-halide picture. It is possible to provide only a single button that functions as both the still-picture button S2 and the shutter release button S3 in place of these two buttons. In that case, more shooting modes need to be provided, but the total number of shooting modes can be minimized by omitting shooting modes that are not very different from others.

Figure 4:
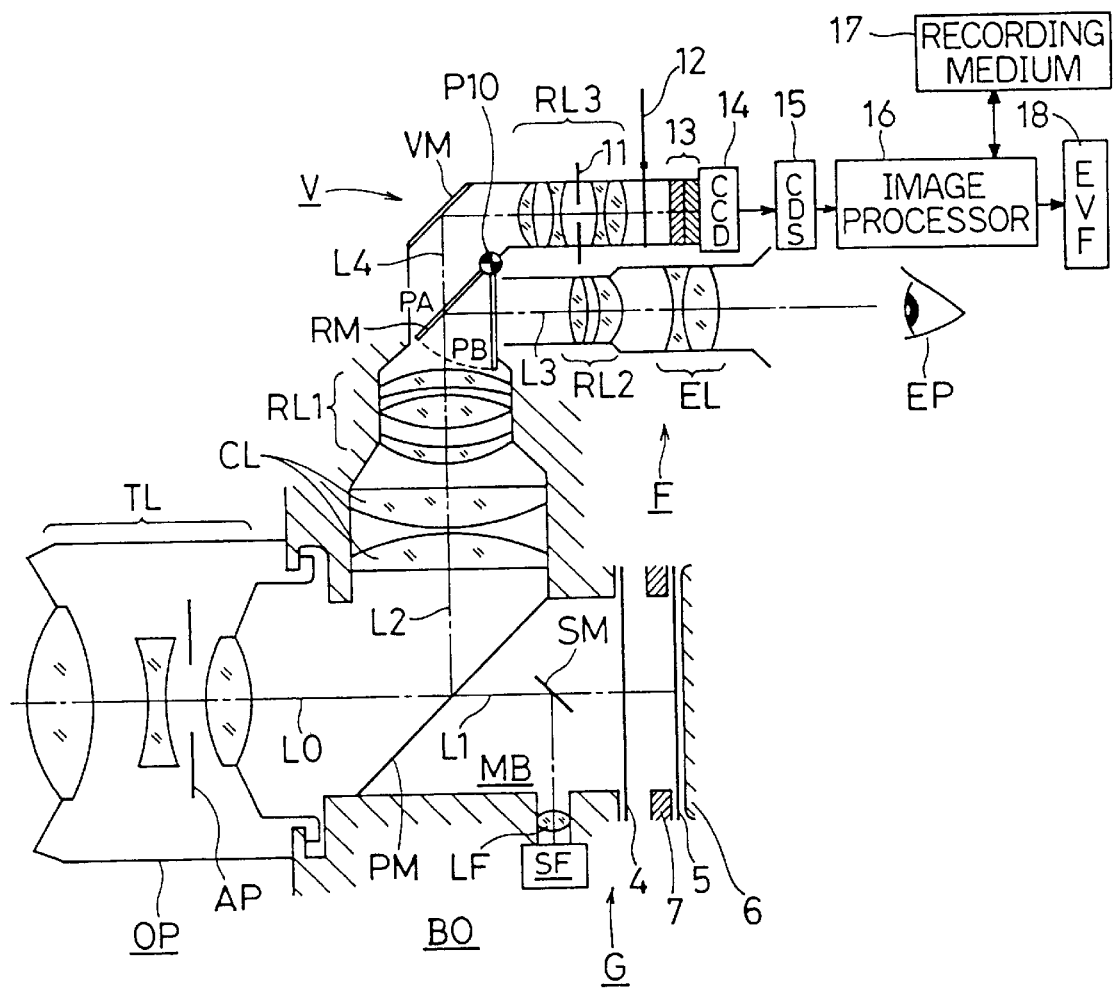
FIG. 4 is a diagram schematically showing the internal construction of the first embodiment.

FIG. 4 schematically shows the internal construction of the camera of the first embodiment. This camera adopts construction type No. 10 (Table 1, FIG. 2) described earlier. In FIG. 4, each of the light flux L0 to L4 is represented by a paraxial ray.

A taking lens TL is housed in a lens barrel OP with such a lens-back distance that allows the light traveling from an object through the taking lens TL to be focused to form an image on the surface of a film 5. The lens barrel OP is removably attached to a camera body BO through a bayonet mount. Accordingly, the taking lens TL can be selected from a wide choice of interchangeable lenses in accordance with the needs on a particular shooting occasion.

Inside the camera body BO, a mirror box MB is provided for supporting a pellicle mirror PM, an AF mirror SM, and other components. Here, the pellicle mirror PM corresponds to the mirror M1 described earlier, and serves to split the light flux L0 having passed through the taking lens TL into a transmitted light flux (a first light flux) L1 and a reflected light flux (a second light flux) L2. The light distribution proportion (transmittance) for the first light flux L1, which is directed to a film 5 (i.e. to a silver-halide shooting system G), is 67%, and the light distribution proportion (reflectance) for the second light flux L2, which is directed to a condenser lens CL (i.e. to an optical viewfinder system F and to a video shooting system V), is 33%. Thus, the light distribution proportions for the silver-halide shooting system G, the video shooting system V, and the optical viewfinder system F satisfy the conditions noted earlier: 50 to 70% to the silver-halide shooting system G, 30 to 50% to the video shooting system V, and 30 to 50% to the optical viewfinder system F.

The silver-halide shooting system G is placed behind the mirror box MB. In the silver-halide shooting system G, to keep the film 5 at the position where the first light flux L1 forms an image, a shutter 4 and film rails 7 are provided in front of the film 5, and a film-pressing plate 6 is provided behind the film 5. The shutter 4 controls the exposure of the film 5; the film rails 7 guide the film 5; the film-pressing plate 6 keeps the film 5 flat. The image formed on the surface of the film 5 is recorded through the process of silver-halide photography (i.e. by exposing the film 5 to a focused object image), just as in ordinary single-lens reflex cameras. Of course, any light-sensitive recording medium designed for silver-halide photography can be used instead of the film 5.

The AF mirror SM is placed behind the pellicle mirror PM. Part of the first light flux L1 traveling toward the film 5 is reflected by the AF mirror SM toward the bottom of the mirror box MB, so that the thus reflected light flux forms an image on a distance measurement device SF through an imaging lens LF. The distance measurement device SF is composed, for example, of a line CCD, and outputs AF (autofocus) information, based on which automatic focusing is controlled. The AF mirror SM is designed to be retractable so that it can be kept out of the optical path of the first light flux L1 during film exposure.

The second light flux L2 is first focused to form an image in the vicinity of the condenser lens CL, and is then by the condenser lens CL condensed and directed to the relay lens RL1. After passing through the relay lens RL1, the second light flux L2 is directed to the rotatable mirror RM. As described above, through the light flux splitting function of the pellicle mirror PM, the silver-halide shooting system G receives the first light flux L1, and the rotatable mirror RM receives the second light flux L2.

The rotatable mirror RM is a total-reflection mirror that corresponds to the mirror M2 described earlier, and can be positioned either in position PA or in position PB by its rotation through a predetermined angle about a rotation axis P10. By switching the position of the rotatable mirror RM between positions PA and PB, the subsequent optical path of the incoming second light flux L2 is switched between the optical path of a reflected light flux (a third light flux) L3 and that of a straight light flux (a fourth light flux) L4.

When the rotatable mirror RM is in position PA, the second light flux L2 having passed through the relay lens RL1 is reflected by the rotatable mirror RM, and the thus reflected light flux (the third light flux L3) enters the optical viewfinder system F. The optical viewfinder system F is provided with, from the rotatable mirror RM side, a relay lens RL2 and an eyepiece lens EL. This optical viewfinder system F then directs the third light flux L3 to the user's pupil EP. The image observed by the user at this time is an image obtained by relaying the primary image formed in the vicinity of the condenser lens CL through the relay lenses RL1 and RL2 and then directing it through the eyepiece lens EP to the pupil EP. Accordingly, through the optical viewfinder system F, it is possible to observe an object image whose quality depends on the overall optical performance of the relay lenses RL1 and RL2 and the eyepiece lens EL.

When the rotatable mirror RM is in position PB, the second light flux L2 having passed through the relay lens RL1 directly enters the video shooting system V as the fourth light flux L4. The video shooting system V is provided with, from the rotatable mirror RM side, a reflection mirror VM, a relay lens RL3, an ND filter 12, an IR-cut filter/optical low-pass filter 13, a CCD 14 serving as an image-sensing device, a correlative double sampling circuit (CDS) 15, an image processor 16, a recording medium 17, and an EVF 18.

The fourth light flux L4 is reflected backward by the reflecting mirror VM, and then enters the relay lens RL3. This relay lens RL3 is provided with a relay aperture diaphragm 11, which serves to adjust the exposure amount for the CCD 14. In addition, the ND filter 12, which is placed behind the relay lens RL3, also serves to adjust the exposure amount for the CCD 14. After passing through the relay lens RL3 and the ND filter 12, the fourth light flux L4 passes through the IR-cut filter/optical low-pass filter 13 for cutting infrared radiation and for preventing moiré fringes, and is then refocused to form an image on the light-receiving surface of the CCD 14. The secondary image formed on the light-receiving surface of the CCD 14 is an image obtained by refocusing the primary image formed in the vicinity of the condenser lens CL through the relay lenses RL1 and RL3. Accordingly, through the video shooting system V, it is possible to observe an image whose quality depends on the optical performance of the relay lenses RL1 and RL3.

The thus formed image is then converted into an analog electrical signal through photoelectric conversion by the CCD 14 and through sampling by the CDS 15. This analog signal is then converted into luminance and chrominance signals through analog-to-digital conversion and other processing by the image processor 16. The signals outputted from the image processor 16 are fed to the EVF 18. The EVF 18 is a monitor device composed of a liquid crystal display panel, and is provided on the rear surface of the camera body BO (FIG. 3). When, in the standby state of certain shooting modes, the recording control operation unit is operated (e.g. when the video button S1 is operated), the above signals outputted from the image processor 16 are recorded on the recording medium 17 (e.g. a videocassette tape). Through operation of a playback control operation unit (not shown), images (moving and still pictures) recorded on the recording medium 17 can be reproduced and displayed on the EVF 18.

The first embodiment does not use a focusing screen, but instead lets the user observe an aerial image of the object through the optical viewfinder system F. This is because, as described earlier, in a construction like type No. 10, placing an ordinary focusing screen on the primary image plane (in the vicinity of the condenser lens CL) leads to inferior video image quality. Without a focusing screen, however, focus cannot be confirmed, and, unless good matching of pupils is secured, the viewfinder image may by eclipsed at the periphery of the field of view. These problems can be avoided, as described earlier, by placing a focusing screen made of a liquid crystal dispersion plate on the primary image plane, or by placing an ordinary focusing screen on the secondary image plane, which is formed in the vicinity of the relay lens RL2.

Next, with reference to Table 2, a description will be given of the shooting modes available in the first embodiment, in particular in terms of how the mirrors are controlled in each mode, and which systems are used in each mode and how. In the first embodiment, in which three systems G, V, and F are provided, the EVF 18 and the optical viewfinder system F can each be used as an object observation system, whereas the silver-halide shooting system G and the video shooting system V can each be used as a shooting system. Moreover, the first embodiment allows images to be recorded in silver-halide formats including the 135 format and the IX 240 format (for the Advanced Photo System) as well as in video formats including the moving-picture and still-picture formats.

In Table 2, "OVF" represents the optical viewfinder system F. Moreover, in Table 2, the symbol "○" indicates that object observation or shooting is possible, and the symbol "x" indicates that object observation or shooting is not possible. The symbol "B" following "○" indicates that the object observation system is subjected to a blackout when a silver-halide shot or a video still picture is taken, and the symbol "S1", "S2", or "S3" following "○" indicates that the corresponding type of shooting can be performed by pressing the button S1, S2, or S3.

Shooting mode 1 is a mode in which video moving-picture shooting, video still-picture shooting, silver-halide shooting, or concurrent video moving-picture and silver-halide shooting can be performed while the object is being observed on the EVF 18. When the shooting mode button S0 (FIG. 3) is pressed a few times to set the shooting mode to "1", the camera is put into a standby (ready-for-shooting) state. At this time, the rotatable mirror RM (M2) is held in position PB. When the rotatable mirror RM is in position PB, the video shooting system V receives the fourth light flux L4 (whose light amount is 33% of the light flux L0), and therefore only the EVF 18 can be used as an object observation system. In the standby state, the EVF 18 displays an image of the object.

When, in the standby state, the video button S1 (FIG. 3) is pressed, operations for shooting a video moving picture are started, so that a video moving picture of the object is recorded on the recording medium 17. When, in the middle of moving-picture shooting, the video button S1 is pressed again, the operations for video moving-picture shooting are stopped. When, in the standby state, the still-picture button S2 (FIG. 3) is pressed, operations for shooting a video still picture are performed, so that a video still picture of the object is recorded on the recording medium 17. When, in the standby state or in the middle of moving-picture shooting, the shutter release button S3 (FIG. 3) is pressed, operations for shooting a silver-halide picture are performed. As a result, the shutter 4 is released, and this causes the first light flux L1 (whose light amount is 67% of the light flux L0) to enter the silver-halide shooting system G to achieve the exposure of the film 5. In this way, since the systems G and V can be used concurrently, it is possible to take silver-halide shots in the middle of video moving-picture shooting.

Shooting mode 2 is a mode in which simultaneous silver-halide and video still-picture shooting can be performed while the object is being observed on the EVF 18. Accordingly, this mode provides "release-views" as described earlier. When the shooting mode button S0 (FIG. 3) is pressed a few times to set the shooting mode to "2", the camera is put into a standby (ready-for-shooting) state. At this time, just as in shooting mode 1 described above, the rotatable mirror RM (M2) is held in position PB. When the rotatable mirror RM is in position PB, the video shooting system V receives the fourth light flux L4 (whose light amount is 33% of the light flux L0), and therefore only the EVF 18 can be used as an object observation system. In the standby state, the EVF 18 displays an image of the object.

When, in the standby state, the still-picture button S2 or the shutter release button S3 is pressed, operations for shooting a silver-halide picture and operations for shooting a video still picture are performed simultaneously. As a result, in the silver-halide shooting system G, the shutter 4 is released, and this causes the first light flux L1 (whose light amount is 67% of the light flux L0) to enter the silver-halide shooting system G to achieve the exposure of the film 5; on the other hand, in the video shooting system V, a signal generated when the still-picture button S2 or the shutter release button S3 is pressed causes the CCD 14 to start photoelectric conversion (to produce a video still picture) simultaneously with the releasing of the shutter 4. The exposure of the CCD 14 is controlled by the relay aperture diaphragm 11, the ND filter 12, and an electronic shutter. In this way, it is possible to obtain a video still picture that is substantially identical with the corresponding silver-halide picture formed as a latent image on the film 5.

Shooting mode 3 is a mode in which only silver-halide shooting can be performed while the object is being observed through the optical viewfinder system F. In this mode, the video circuitry including the EVF 18 is kept out of operation so that electric power will not be wasted, that is, this mode allows power-saving silver-halide shooting.

When the shooting mode button S0 is pressed a few times to set the shooting mode to "3", the camera is put into a standby (ready-for-shooting) state. At this time, the rotatable mirror RM (M2) is held in position PA. When the rotatable mirror RM is in position PA, the optical viewfinder system F receives the third light flux L3 (whose light amount is 33% of the light flux L0), and therefsore only the optical viewfinder system F can be used as an object observation system. When, in the standby state, the shutter release button S3 is pressed, operations for shooting a silver-halide picture are performed. As a result, the shutter 4 is released, and this causes the first light flux L1 (whose light amount is 67% of the light flux L0) to enter the silver-halide shooting system G to achieve the exposure of the film 5.

Shooting mode 4 is a mode in which simultaneous silver-halide and video still-picture shooting can be performed while the object is being observed through the optical viewfinder system F. Accordingly, this mode provides "release-views" as described earlier. In addition, in this mode, the EVF 18 is kept out of operation so that electric power will not be wasted, that is, this mode allows power-saving simultaneous silver-halide and video still-picture shooting.

When the shooting mode button S0 is pressed a few times to set the shooting mode to "4", the camera is put into a standby (ready-for-shooting) state. At this time, just as in shooting mode 3 described above, the rotatable mirror RM (M2) is held in position PA. When the rotatable mirror RM is in position PA, the optical viewfinder system F receives the third light flux L3 (whose light amount is 33% of the light flux L0), and therefore only the optical viewfinder system F can be used as an object observation system.

When, in the standby state, the still-picture button S2 or the shutter release button S3 is pressed, operations for shooting a silver-halide picture and operations for shooting a video still picture are performed simultaneously. As a result, in the silver-halide shooting system G, the shutter 4 is released, and this causes the first light flux L1 (whose light amount is 67% of the light flux L0) to enter the silver-halide shooting system G to achieve the exposure of the film 5; on the other hand, in the video shooting system V, a signal generated when the still-picture button S2 or the shutter release button S3 is pressed causes the rotatable mirror RM to move from position PA to PB and then back to PA, like an ordinary quick-return mirror.

When the rotatable mirror RM moves to position PB (i.e. to the retracted position), the video shooting system V receives the fourth light flux L4 (whose light amount is 33% of the light flux L0). The CCD 14 starts photoelectric conversion simultaneously with the releasing of the shutter 4. The exposure of the CCD 14 is controlled by the relay aperture diaphragm 11, the ND filter 12, and an electronic shutter. When the exposure of the CCD 14 is complete, the rotatable mirror RM returns from position PB to position PA (i.e. to the ordinary position). In this way, it is possible to obtain a video still picture that is substantially identical with the corresponding silver-halide picture formed as a latent image on the film 5. Note that, when the rotatable mirror RM is in position PB, the optical viewfinder system F is subjected to a blackout. That is, in the first embodiment, the object observation system is subjected to a blackout only in shooting mode 4.

As described above, the first embodiment provides four shooting modes; however, many variations are possible in the configuration of shooting modes. For example, as one variation, it is possible to divide shooting mode 1 into two modes: one in which silver-halide shooting can be performed by pressing the shutter release button S3 in the middle of video moving-picture shooting, and the other in which only video shooting can be performed (silver-halide shooting cannot be performed by pressing the shutter release button S3 in the middle of video moving-picture shooting). This helps prevent silver-halide shooting from being performed unintentionally during video moving-picture shooting. As another variation, it is possible to provide the camera with an additional means for detecting whether the user is looking through the optical viewfinder system F. This makes it possible to turn off the EVF 18 and make only shooting modes 3 and 4 selectable when the user is found to be looking through the optical viewfinder system F. It is to be understood that such variations can be applied also in the second to fifth embodiments described henceforth.

Figure 5:
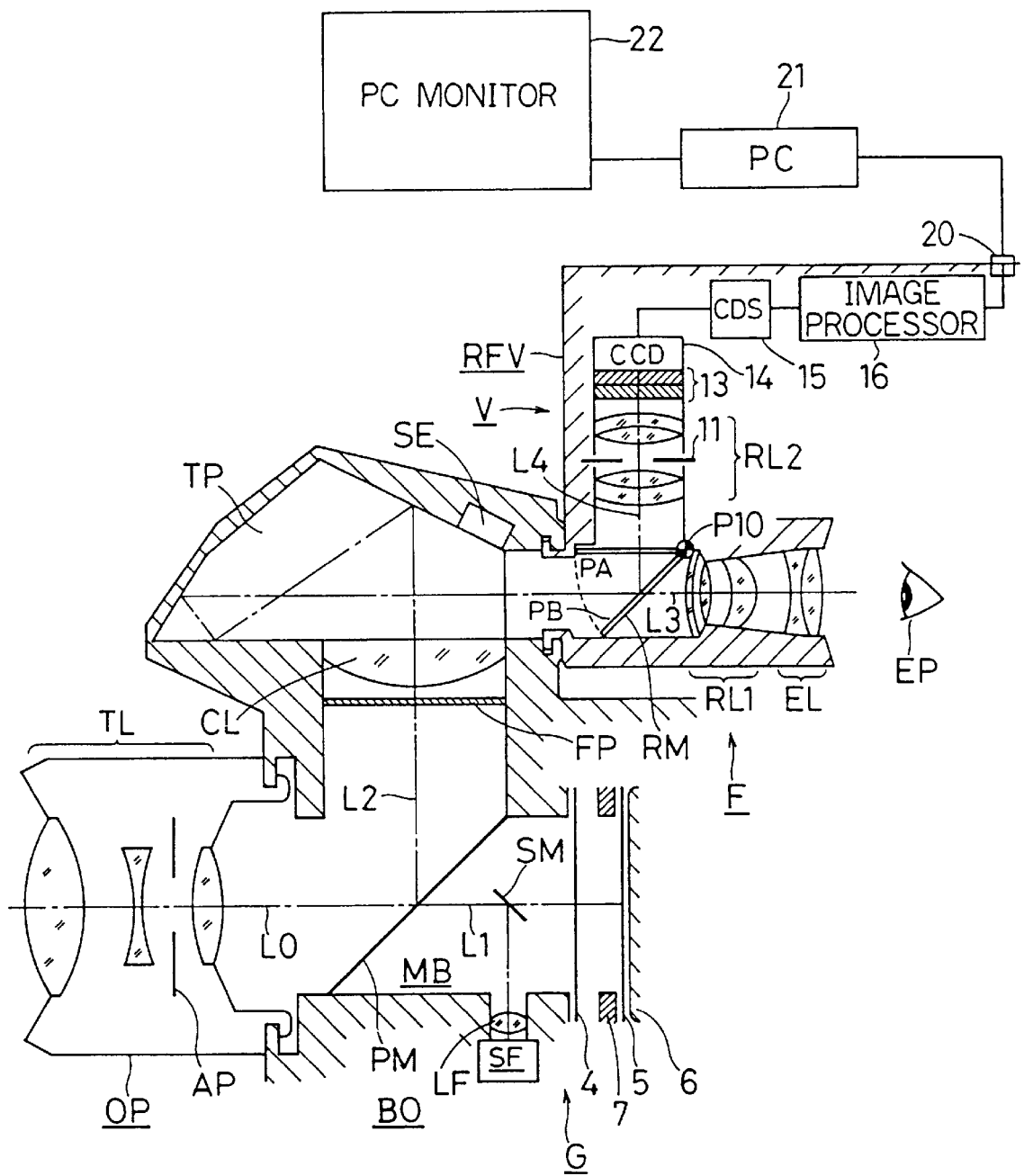
FIG. 5 is a diagram schematically showing the internal construction of the second embodiment.

FIG. 5 schematically shows the internal construction of the camera of the second embodiment. This camera adopts construction type No. 10 (Table 1, FIG. 2) described earlier. In FIG. 5, each of the light flux L0 to L4 is represented by a paraxial ray.

As in the first embodiment, a taking lens TL is housed in a lens barrel OP that is removably attached to a camera body BO through a bayonet mount. Accordingly, the taking lens TL can be selected from a wide choice of interchangeable lenses in accordance with the needs on a particular shooting occasion.

Inside the camera body BO, a mirror box MB is provided for supporting a pellicle mirror PM, an AF mirror SM, and other components. Here, the pellicle mirror PM corresponds to the mirror M1 described earlier, and serves to split the light flux L0 having passed through the taking lens TL into a transmitted light flux (a first light flux) L1 and a reflected light flux (a second light flux) L2. The light distribution proportion (transmittance) for the first light flux L1, which is directed to a film 5 (i.e. to a silver-halide shooting system G), is 50%, and the light distribution proportion (reflectance) for the second light flux L2, which is directed to a condenser lens CL (i.e. to an optical viewfinder system F and to a video shooting system V), is 50%. Thus, the light distribution proportions for the silver-halide shooting system G, the video shooting system V, and the optical viewfinder system F satisfy the conditions noted earlier: 50 to 70% to the silver-halide shooting system G, 30 to 50% to the video shooting system V, and 30 to 50% to the optical viewfinder system F.

The silver-halide shooting system G is placed behind the mirror box MB. In the silver-halide shooting system G, to keep the film 5 at the position where the first light flux L1 forms an image, a shutter 4 and film rails 7 are provided in front of the film 5, and a film-pressing plate 6 is provided behind the film 5. The shutter 4 controls the exposure of the film 5; the film rails 7 guide the film 5; the film-pressing plate 6 keeps the film 5 flat. The image formed on the surface of the film 5 is recorded through the process of silver-halide photography (i.e. by exposing the film 5 to a focused object image), just as in ordinary single-lens reflex cameras. Of course, any light-sensitive recording medium designed for silver-halide photography can be used instead of the film 5.

The AF mirror SM is placed behind the pellicle mirror PM. Part of the first light flux L1 traveling toward the film 5 is reflected by the AF mirror SM toward the bottom of the mirror box MB, so that the thus reflected light flux forms an image on a distance measurement device SF through an imaging lens LF. The distance measurement device SF is composed, for example, of a line CCD, and outputs AF (autofocus) information, based on which automatic focusing is controlled. The AF mirror SM is designed to be retractable so that it can be kept out of the optical path of the first light flux L1 during film exposure.

In front of the condenser lens CL, in its vicinity, a focusing screen FP is placed. The second light flux L2 is first focused to form an image on this focusing screen FP. The focusing screen FP is composed of a liquid crystal dispersion plate, and is so controlled that it scatters light rays when the object image (the primary image) is observed through the optical viewfinder system F and that it does not scatter them when video shooting is performed. This prevents the video shooting system V from being affected by the presence of the focusing screen FP.

After passing through the focusing screen FP, the second light flux L2 is by the condenser lens CL condensed and directed to a trapezoid prism TP. Above the trapezoid prism TP, a photometry device SE is placed in a position from which it can look over the primary image formed on the focusing screen FP. The photometry device SE outputs AE (autoexposure) information, based on which automatic exposure is controlled. The second light flux L2 is then reflected three times inside the trapezoid prism TP, and is then directed to a rotatable mirror RM provided in a removable viewfinder/video unit RFV. As described above, through the light flux splitting function of the pellicle mirror PM, the silver-halide shooting system G receives the first light flux L1, and the rotatable mirror RM receives the second light flux L2.

The removable viewfinder/video unit RFV incorporates, as well as the rotatable mirror RM, an optical viewfinder system F and a video shooting system V. The second embodiment is different from the first embodiment primarily in that the optical viewfinder system F and the video shooting system V can be removed from the camera body BO. The removable viewfinder/video unit RFV is removably attached to the camera body BO through a bayonet mount. Accordingly, if, in addition to the removable viewfinder/video unit RFV, other removable units (e.g. a unit provided with an optical viewfinder system F alone, a unit provided with a video shooting system V alone, etc.) are prepared, it is possible to use them interchangeably to suit the needs of a particular shooting occasion. The removable viewfinder/video unit RFV exchanges data with the camera body BO via electrical contacts or cables provided in the bayonet mount.

The rotatable mirror RM is a total-reflection mirror that corresponds to the mirror M2 described earlier, and can be positioned either in position PA or in position PB by its rotation through a predetermined angle about a rotation axis P10. By switching the position of the rotatable mirror RM between positions PA and PB, the subsequent optical path of the incoming second light flux L2 is switched between the optical path of a reflected light flux (a third light flux) L3 and that of a straight light flux (a fourth light flux) L4.

When the rotatable mirror RM is in position PA, the second light flux L2 having entered the removable viewfinder/video unit RFV directly enters the optical viewfinder system F as the third light flux L3. The optical viewfinder system F is provided with, from the rotatable mirror RM side, a relay lens RL1 and an eyepiece lens EL. This optical viewfinder system F then directs the third light flux L3 to the user's pupil EP. The image observed by the user at this time is the primary image formed on the focusing screen FP. Accordingly, focus can be confirmed through the optical viewfinder system F.

When the rotatable mirror RM is in position PB, the second light flux L2 having entered the removable viewfinder/video unit RFV is reflected by the rotatable mirror RM, and the thus reflected light flux (the fourth light flux L4) enters the video shooting system V. The video shooting system V is provided with, from the rotatable mirror RM side, a relay lens RL2, an IR-cut filter/optical low-pass filter 13, a CCD 14 serving as an image-sensing device, a correlative double sampling circuit (CDS) 15, an image processor 16, and a connector 20.

The fourth light flux L4 first enters the relay lens RL2. This relay lens RL2 is provided with a relay aperture diaphragm 11, which serves to adjust the exposure amount for the CCD 14. After passing through the relay lens RL2, the fourth light flux L4 passes through the IR-cut filter/optical low-pass filter 13 for cutting infrared radiation and for preventing moiré fringes, and is then refocused to form an image on the light-receiving surface of the CCD 14. The secondary image formed on the light-receiving surface of the CCD 14 originates from the primary image formed on the focusing screen FP. However, since the focusing screen FP does not scatter light rays, it does not degrade the quality of the video image.

The thus formed image is then converted into an analog electrical signal through photoelectric conversion by the CCD 14 and through sampling by the CDS 15. This analog signal is then converted into RGB signals through analog-to-digital conversion and other processing by the image processor 16. These RGB signals are outputted via the connector 20. This connector 20 can be connected by a cable to a personal computer (PC) 21 that is connected to a PC monitor 22. Accordingly, the removable viewfinder/video unit RFV can exchange signals with the personal computer 21 through the cable connected to the connector 20. The signals outputted via the connector 20 are fed to the personal computer 21. The personal computer 21 displays video pictures obtained from the video shooting system V on the screen of the PC monitor 22. In this way, the user can view the object image or reproduced images on the screen of the PC monitor 22.

Next, with reference to Table 3, a description will be given of the shooting modes available in the second embodiment, in particular in terms of how the mirrors are controlled in each mode, and which systems are used in each mode and how. In the second embodiment, in which three systems G, V, and F are provided, the PC monitor 22 and the optical viewfinder system F can each be used as an object observation system, whereas the silver-halide shooting system G and the video shooting system V can each be used as a shooting system.

Moreover, the second embodiment allows images to be recorded in silver-halide formats including the 120 (220) format, the 135 format, and the IX 240 format (for the Advanced Photo System) as well as in video formats including the moving-picture and still-picture formats. Note that this embodiment allows the use of the 120 (220) format which is larger in size than the other silver-halide formats; this is made possible as a result of placing all the relay lenses RL1 and RL2 outside the camera body (i.e. in the removable viewfinder/video unit RFV). In Table 3, "PCM" and "OVF" represent the PC monitor 22 and the optical viewfinder system F, respectively. Moreover, in Table 3, the symbols "∘" and "x", as well as "B" and "S3" attached to "∘", have the same meanings as in Table 2; in addition, the letter "P" following "∘" indicates that the corresponding type of shooting can be performed through operation on the personal computer 21.

Shooting mode 1 is a mode in which video moving-picture shooting, video still-picture shooting, silver-halide shooting, or concurrent video moving-picture and silver-halide shooting can be performed while the object is being observed on the PC monitor 22. When the shooting mode button S0 (provided on the removable viewfinder/video unit RFV) is pressed a few times to set the shooting mode to "1", the camera is put into a standby (ready-for-shooting) state. At this time, the rotatable mirror RM (M2) is held in position PB. When the rotatable mirror RM is in position PB, the video shooting system V receives the fourth light flux L4 (whose light amount is 50% of the light flux L0), and therefore only the PC monitor 22 can be used as an object observation system. In the standby state, the PC monitor 22 displays an image of the object.

When, in the standby state, the personal computer 21 is operated in a predefined way, operations for shooting a video moving picture are started, so that a video moving picture of the object is recorded on a recording medium (such as a disk) provided in the personal computer 21. The operations for video moving-picture shooting can be stopped by operating the personal computer 21 again. Video still-picture shooting can also be performed by operating the personal computer 21 in the standby state. When, in the standby state or in the middle of moving-picture shooting, the shutter release button S3 (FIG. 3) is pressed, operations for shooting a silver-halide picture are performed. As a result, the shutter 4 is released, and this causes the first light flux L1 (whose light amount is 50% of the light flux L0) to enter the silver-halide shooting system G to achieve the exposure of the film 5. In this way, since the systems G and V can be used concurrently, it is possible to take silver-halide shots in the middle of video moving-picture shooting.

Shooting mode 2 is a mode in which simultaneous silver-halide and video still-picture shooting can be performed while the object is being observed on the PC monitor 22. Accordingly, this mode provides "release-views" as described earlier. When the shooting mode button S0 (FIG. 3) is pressed a few times to set the shooting mode to "2", the camera is put into a standby (ready-for-shooting) state. At this time, just as in shooting mode 1 described above, the rotatable mirror RM (M2) is held in position PB. When the rotatable mirror RM is in position PB, the video shooting system V receives the fourth light flux L4 (whose light amount is 50% of the light flux L0), and therefore only the PC monitor 22 can be used as an object observation system. In the standby state, the PC monitor 22 displays an image of the object.

When, in the standby state, the personal computer 21 is operated in a predefined way or the shutter release button S3 is pressed, operations for shooting a silver-halide picture and operations for shooting a video still picture are performed simultaneously. As described previously, the personal computer 21, the removable viewfinder/video unit RFV, and the camera body BO exchange signals with one another via the contacts or cables provided in the bayonet mounts. As a result, when simultaneous shooting is started, in the silver-halide shooting system G, the shutter 4 is released, and this causes the first light flux L1 (whose light amount is 50% of the light flux L0) to enter the silver-halide shooting system G to achieve the exposure of the film 5; on the other hand, in the video shooting system V, a signal generated when the personal computer 21 is operated or the shutter release button S3 is pressed causes the CCD 14 to start photoelectric conversion (to produce a video still picture) simultaneously with the releasing of the shutter 4. The exposure of the CCD 14 is controlled by the relay aperture diaphragm 11 and an electronic shutter. In this way, it is possible to obtain a video still picture that is substantially identical with the corresponding silver-halide picture formed as a latent image on the film 5.

Shooting mode 3 is a mode in which only silver-halide shooting can be performed while the object is being observed through the optical viewfinder system F. In this mode, the video circuitry including the PC monitor 22 is kept out of operation so that electric power will not be wasted, that is, this mode allows power-saving silver-halide shooting.

When the shooting mode button S0 is pressed a few times to set the shooting mode to "3", the camera is put into a standby (ready-for-shooting) state. At this time, the rotatable mirror RM (M2) is held in position PA. When the rotatable mirror RM is in position PA, the optical viewfinder system F receives the third light flux L3 (whose light amount is 50% of the light flux L0), and therefore only the optical viewfinder system F can be used as an object observation system. When, in the standby state, the shutter release button S3 is pressed, operations for shooting a silver-halide picture are performed. As a result, the shutter 4 is released, and this causes the first light flux L1 (whose light amount is 50% of the light flux L0) to enter the silver-halide shooting system G to achieve the exposure of the film 5.

Shooting mode 4 is a mode in which simultaneous silver-halide and video still-picture shooting can be performed while the object is being observed through the optical viewfinder system F. Accordingly, this mode provides "release-views" as described earlier. In addition, in this mode, the PC monitor 22 is kept out of operation so that electric power will not be wasted, that is, this mode allows power-saving simultaneous silver-halide and video still-picture shooting.

When the shooting mode button S0 is pressed a few times to set the shooting mode to "4", the camera is put into a standby (ready-for-shooting) state. At this time, just as in shooting mode 3 described above, the rotatable mirror RM (M2) is held in position PA. When the rotatable mirror RM is in position PA, the optical viewfinder system F receives the third light flux L3 (whose light amount is 50% of the light flux L0), and therefore only the optical viewfinder system F can be used as an object observation system.

When, in the standby state, the personal computer 21 is operated or the shutter release button S3 is pressed, operations for shooting a silver-halide picture and operations for shooting a video still picture are performed simultaneously. As described previously, the personal computer 21, the removable viewfinder/video unit RFV, and the camera body BO exchange signals with one another via the contacts or cables provided in the bayonet mounts. As a result, when simultaneous shooting is started, in the silver-halide shooting system G, the shutter 4 is released, and this causes the first light flux L1 (whose light amount is 50% of the light flux L0) to enter the silver-halide shooting system G to achieve the exposure of the film 5; on the other hand, in the video shooting system V, a signal generated when the personal computer 21 is operated or the shutter release button S3 is pressed causes the rotatable mirror RM to move from position PA to PB and then back to PA, like an ordinary quick-return mirror.

When the rotatable mirror RM moves to position PB (i.e. to the retracted position), the video shooting system V receives the fourth light flux L4 (whose light amount is 50% of the light flux L0). The CCD 14 starts photoelectric conversion simultaneously with the releasing of the shutter 4. The exposure of the CCD 14 is controlled by the relay aperture diaphragm 11 and an electronic shutter. When the exposure of the CCD 14 is complete, the rotatable mirror RM returns from position PB to position PA (i.e. to the ordinary position). In this way, it is possible to obtain a video still picture that is substantially identical with the corresponding silver-halide picture formed as a latent image on the film 5. Note that, when the rotatable mirror RM is in position PB, the optical viewfinder system F is subjected to a blackout. That is, in the second embodiment, the object observation system is subjected to a blackout only in shooting mode 4.

A camera like that of the second embodiment which makes up a photographing system in combination with a personal computer 21 is especially useful when used in a mode like shooting mode 2 or 4 that provides release-views. This is because, through image processing by the personal computer 21, it is possible to make video still pictures as identical as possible with silver-halide pictures formed as latent images on the film 5. For example, shades caused when the aperture diaphragm AP of the taking lens TL is excessively stopped down can be removed through image processing by the personal computer 21 (i.e. image processing based on a data table stored beforehand in the personal computer 21). This means that it is possible to observe images free from undesirable shades on the PC monitor 22. Image processing by a personal computer 21 is especially useful in professional applications as in a photo studio, because it allows customers (the object) to select pictures they like from images that are electronically presented to them on site, and thus it is possible to print only necessary pictures that are sure to satisfy the customers.

Figure 6:
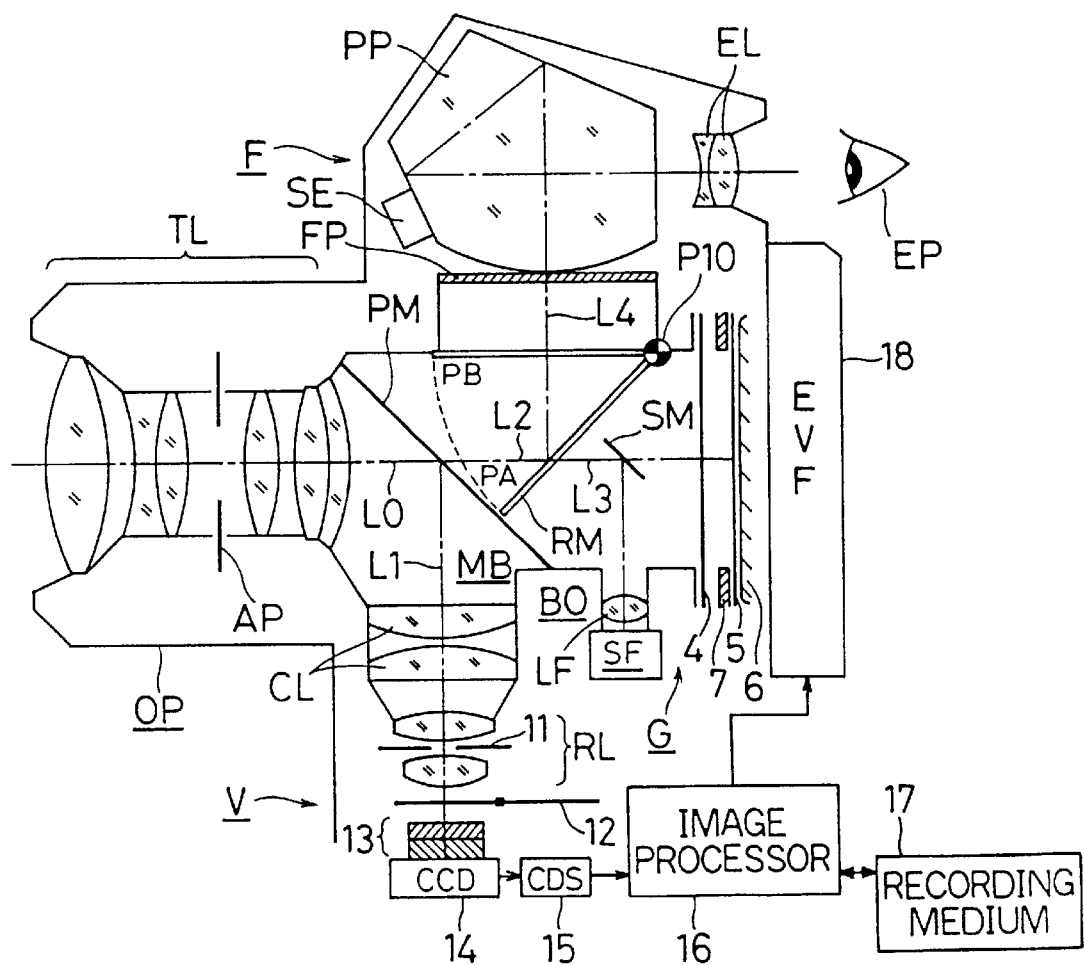
FIG. 6 is a diagram schematically showing the internal construction of the third embodiment.
Figure 9:
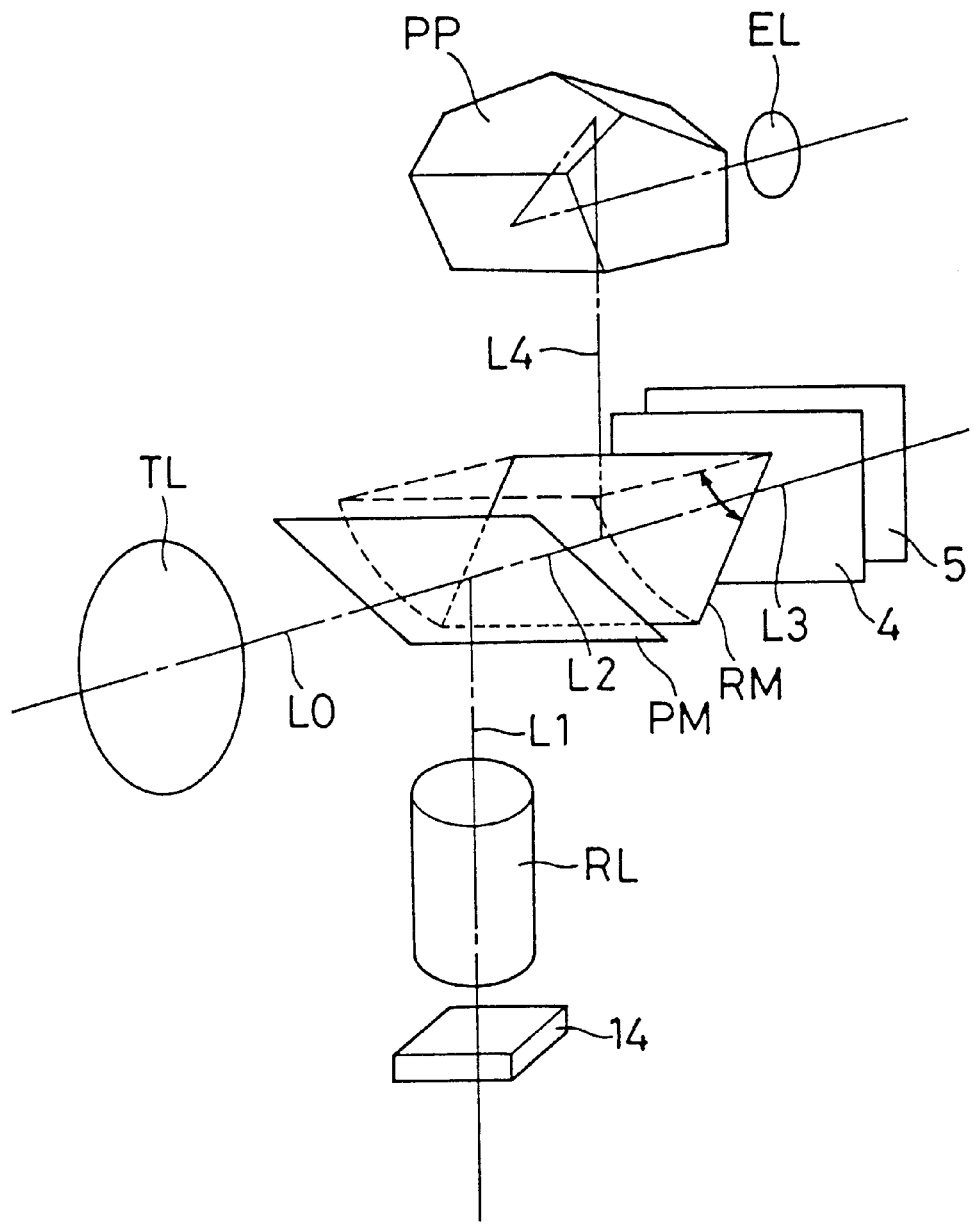
FIG. 9 is a diagram schematically showing the optical paths and the arrangement of the principal components in the third embodiment.
Figure 10:
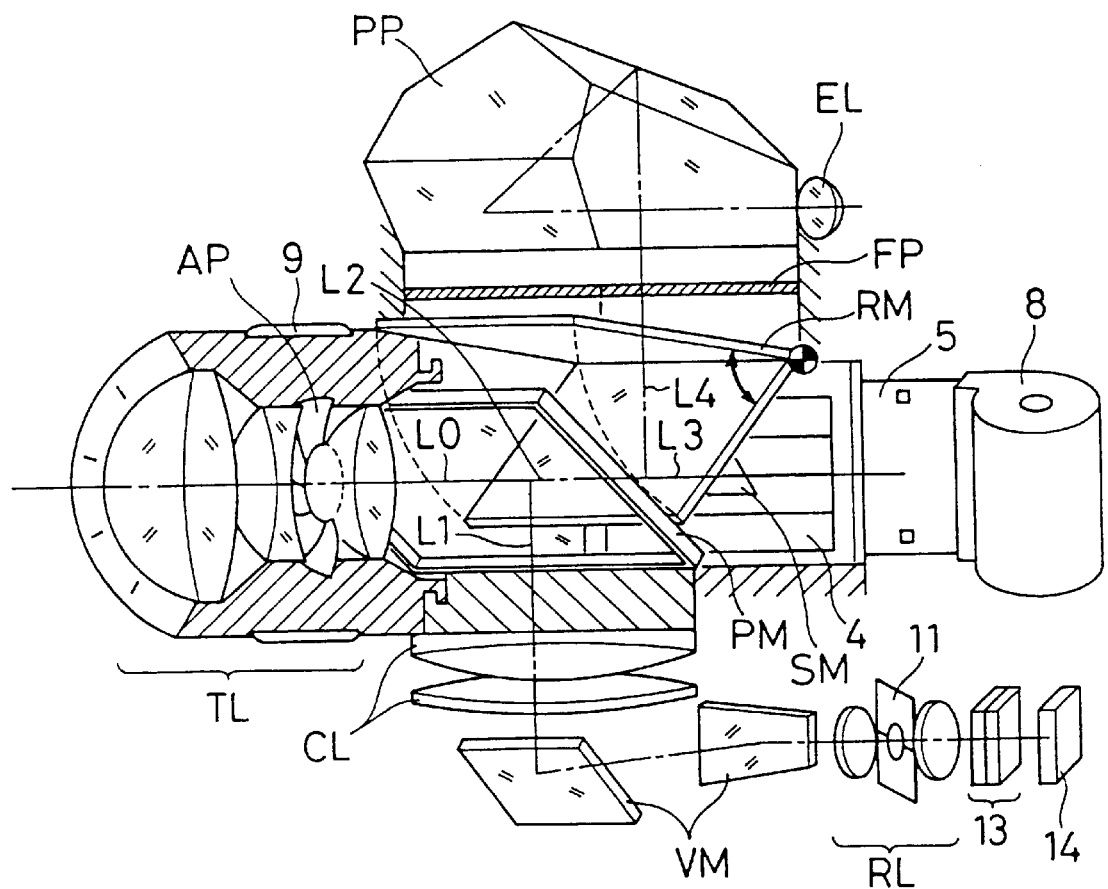
FIG. 10 is a diagram showing the internal construction of the third embodiment as seen obliquely from the front.
Figure 11A:
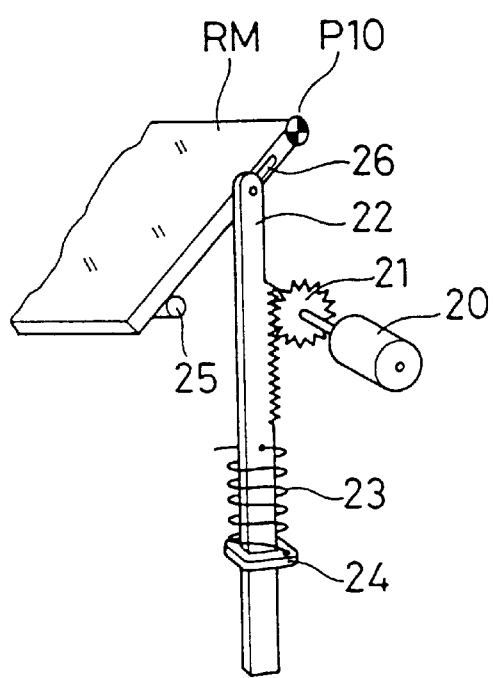
FIGS. 11A and 11B are perspective views of the drive mechanism for driving the rotatable mirror employed in the third embodiment.
Figure 11B:
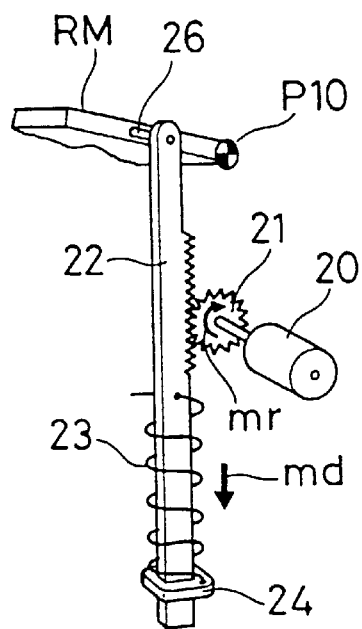

FIG. 6 schematically shows the internal construction of the camera of the third embodiment. This camera adopts construction type No. 2 (Table 1, FIG. 2) described earlier. In FIG. 6, each of the light flux L0 to L4 is represented by a paraxial ray. FIG. 9 schematically shows the optical paths and the arrangement of the principal components in this embodiment. FIG. 10 shows the internal construction of this embodiment as seen obliquely from the front. FIGS. 11A and 11B show the drive mechanism for the rotatable mirror employed in this embodiment.

A taking lens TL is housed in a lens barrel OP with such a lens-back distance that allows the light traveling from an object through the taking lens TL to be focused to form an image on the surface of a film 5. The taking lens TL has an aperture diaphragm AP inside it, and the lens barrel OP has an operation ring 9 (FIG. 10) around its outer surface. The lens barrel OP is formed as a single unit with a camera body BO, though it is also possible to design the lens barrel OP to be interchangeable as in the first embodiment.

Inside the camera body BO, a mirror box MB is provided for supporting a pellicle mirror PM, a rotatable mirror RM, an AF mirror SM, and other components. Here, the pellicle mirror PM corresponds to the mirror M1 described earlier, and serves to split the light flux L0 having passed through the taking lens TL into a reflected light flux (a first light flux) L1 and a transmitted light flux (a second light flux) L2. The light distribution proportion (reflectance) for the first light flux L1, which is directed to a condenser lens CL (i.e. to a video shooting system V), is 33%, and the light distribution proportion (transmittance) for the second light flux L2, which is directed to the rotatable mirror RM (i.e. to an optical viewfinder system F and to a silver-halide shooting system G), is 67%. Thus, the light distribution proportion for the video shooting system V satisfies the condition noted earlier: 30 to 50% of the light flux L0.

The video shooting system V is provided with, from the pellicle mirror PM side, a condenser lens CL, two reflection mirrors VM (FIG. 10), a relay lens RL, an ND filter 12, an IR-cut filter/optical low-pass filter 13, a CCD 14 serving as an image-sensing device, a correlative double sampling circuit (CDS) 15, an image processor 16, a recording medium 17, and an EVF 18.

The first light flux L1 is directed by the pellicle mirror PM to the condenser lens CL, and is then by the condenser lens CL condensed and directed to the relay lens RL. This relay lens RL is provided with a relay aperture diaphragm 11, which serves to adjust the exposure amount for the CCD 14. In addition, the ND filter 12, which is placed behind the relay lens RL, also serves to adjust the exposure amount for the CCD 14. After passing through the relay lens RL and the ND filter 12, the first light flux L1 passes through the IR-cut filter/optical low-pass filter 13 for cutting infrared radiation and for preventing moiré fringes, and is then focused to form an image on the light-receiving surface of the CCD 14.

The thus formed image is then converted into an analog electrical signal through photoelectric conversion by the CCD 14 and through sampling by the CDS 15. This analog signal is then converted into luminance and chrominance signals through analog-to-digital conversion and other processing by the image processor 16. The signals outputted from the image processor 16 are fed to the EVF 18. The EVF 18 is a monitor device composed of a liquid crystal display panel, and is provided on the rear surface of the camera body BO (FIG. 3). When, in the standby state of certain shooting modes, the recording control operation unit is operated (e.g. when the video button S1 is operated), the above signals outputted from the image processor 16 are recorded on the recording medium 17 (e.g. a videocassette tape). Through operation of a playback control operation unit (not shown), images (moving and still pictures) recorded on the recording medium 17 can be reproduced and displayed on the EVF 18.

Through the light flux splitting function of the pellicle mirror PM, the video shooting system V receives the first light flux L1, and the rotatable mirror RM receives the second light flux L2. The rotatable mirror RM corresponds to the mirror M2 described earlier, and can be positioned either in position PA or in position PB by its rotation through a predetermined angle about a rotation axis P10. By switching the position of the rotatable mirror RM between positions PA and PB, the subsequent optical path of the incoming second light flux L2 is switched between the optical path of a straight light flux (a third light flux) L3 and that of a reflected light flux (a fourth light flux) L4.

When the rotatable mirror RN is in position PB, the second light flux L2 directly enters the silver-halide shooting system G as the third light flux L3. As a result, the silver-halide shooting system G receives 67% of the light flux L0. Thus, the light distribution proportion for the silver-halide shooting system G satisfies the condition noted earlier: 50 to 70% of the light flux L0.

The silver-halide shooting system G is for directing the incoming third light flux L3 to the film 5 used as a light-sensitive recording medium, and is placed behind the mirror box MB. In FIG. 10, the film 5, as extracted out of a film cartridge 8, is shown. In the silver-halide shooting system G, to keep the film 5 at the position where the third light flux L3 forms an image, a shutter 4 and film rails 7 are provided in front of the film 5, and a film-pressing plate 6 is provided behind the film 5. The shutter 4 controls the exposure of the film 5; the film rails 7 guide the film 5; the film-pressing plate 6 keeps the film 5 flat. The image formed on the surface of the film 5 is recorded through the process of silver-halide photography (i.e. by exposing the film 5 to a focused object image), just as in ordinary single-lens reflex cameras. Of course, any light-sensitive recording medium designed for silver-halide photography can be used instead of the film 5.

When the rotatable mirror RM is in position PA, the second light flux L2 is reflected by the rotatable mirror RM, and the thus reflected light flux (the fourth light flux L4) enters the optical viewfinder system F. The optical viewfinder system F is provided with, from the rotatable mirror RM side, a focusing screen FP, a pentaprism PP, and an eyepiece lens EL. The focusing screen FP is placed at the position where the fourth light flux L4 is focused to form an image. The focusing screen FP is of the type used in ordinary single-lens reflex cameras, and is composed of a dispersion plate that scatters light rays all the time. The object image formed on the focusing screen FP is directed by the pentaprism PP to the eyepiece lens EL so as to be observed by the user's pupil EP. This allows the user to adjust focus manually while observing the object through the optical viewfinder system F. In front of the pentaprism PP, a photometry device SE is placed in a position from which it can look over the object image formed on the focusing screen FP. The photometry device SE outputs AE (autoexposure) information, based on which automatic exposure is controlled.

To direct part of the second light flux L2 to the AF mirror SM, the rotatable mirror RM has a half-mirror portion and a total-reflection-mirror portion (it may be designed to be a whole-surface half mirror). The reflectance of the rotatable mirror RM is 50% or more. Accordingly, when the rotatable mirror RM is in position PA, the optical viewfinder system F receives 33% or more of the light flux L0. Thus, the light distribution proportion for the optical viewfinder system F satisfies the condition noted earlier: 30 to 50% of the light flux L0.

When the rotatable mirror RM is in position PA, the part of the second light flux L2 that has passed through the above half-mirror portion enters the AF mirror SM placed behind the rotatable mirror RM, and is then reflected by the AF mirror SM toward the bottom of the mirror box MB. The thus reflected light flux is focused by an imaging lens LF to form an image on a distance measurement device SF. The distance measurement device SF is composed, for example, of a line CCD, and outputs AF (autofocus) information, based on which automatic focusing is controlled. The AF mirror SM is designed to be retractable so that it can be kept out of the optical path of the third light flux L3 during film exposure.

Here, with reference to FIGS. 11A and 11B, a description will be given of the movement of the rotatable mirror RM. FIG. 11A shows the rotatable mirror RM as positioned in position PA, and FIG. 11B shows the rotatable mirror RM as positioned in position PB. The rotatable mirror RM has a groove 26 formed on one of its side surface. To this groove 26, a support bar 22 is attached such that the rotatable mirror RM is guided along the groove 26. The support bar 22 is placed through a hole formed in a spring stopper 24 for supporting a spring 23 whose one end is fixed to the support bar 22 and whose other end is fixed to the spring stopper 24.

As shown in FIG. 11A, when the rotatable mirror RM is in position PA, it is held there by being pressed down against a stopper 25 by the support bar 22 through the contraction force of the spring 23. As shown in FIG. 11B, when a certain button operation as described later is performed, a motor 20, together with a gear 21 attached to its shaft, rotates in the direction indicated by arrow mr. This causes the support bar 22, which is engaged with the gear 21, to push up the rotatable mirror RM against the contraction force (indicated by arrow md) of the spring 23. Then, as long as the motor 20 is kept supplied with electric power, the rotatable mirror RM remains in the pushed-up state shown in FIG. 11B, i.e. in position PB. When a series of operations for exposure, including the releasing and closing of the shutter 4, is complete, the supply of electric power to the motor 20 is cut off. This causes the rotatable mirror RM to return to the state shown in FIG. 11A through the contraction force of the spring 23. At this time, the motor 20 and the gear 21 act as a damper to damp mechanical shocks.

Next, a description will be given of the directions in which the first and fourth light flux are directed. In the third embodiment, the direction in which the pellicle mirror PM reflects the light flux for the video shooting system V and the direction in which the rotatable mirror RM reflects the light flux for the optical viewfinder system F are opposite to each other. That is, in a plane including the optical paths of the first and second light flux L1 and L2, and with respect to the second light flux L2, the direction in which the second light flux L2, after being reflected, travels as the fourth light flux L4 (toward the focusing screen FP) is opposite to the direction in which the first light flux L1 travels (toward the condenser lens CL). On the other hand, the pellicle mirror PM is so placed as to make an angle of about 45° to the optical axis of the taking lens TL (represented by the dash-dot line indicating the light flux L0), and the rotatable mirror RM is so placed as to make an angle of about 45° to the optical axis of the taking lens TL when the optical path for the fourth light flux L4 is selected. Accordingly, the optical paths of the first and fourth light flux L1 and L4 are substantially parallel to each other.

If the direction in which the pellicle mirror PM reflects the light flux for the video shooting system V and the direction in which the rotatable mirror RM reflects the light flux for the optical viewfinder system F are the same, the pellicle mirror PM obstructs the movement of the rotatable mirror RM, or the optical path of the first light flux L1 is intercepted by the rotatable mirror RM. Even if the above two reflection directions are opposite, as long as the rotatable mirror RM and the pellicle mirror PM are arranged in this order from the taking lens TL side, the pellicle mirror PM obstructs the movement of the rotatable mirror RM, or the optical path of the light flux reflected by the pellicle mirror PM is intercepted by the rotatable mirror RM. These problems can be avoided by securing a longer lens-back distance, but doing so results in a complex lens design and a larger front-rear dimension of the camera.

In the third embodiment, since the direction in which the pellicle mirror PM reflects the light flux for the video shooting system V and the direction in which the rotatable mirror RM reflects the light flux for the optical viewfinder system F are opposite to each other, the optical path of the first light flux L1 is not intercepted by the rotatable mirror RM, nor is the movement of the rotatable mirror RM obstructed by the pellicle mirror PM. That is, even if the mirror box MB is made slimmer in the front-rear direction, it does not cause the pellicle mirror PM, the front one, to obstruct the movement of the rotatable mirror RM, the rear one; nor does it cause one of the mirrors to block the optical path of the light flux reflected by the other. As a result, it is possible to shorten the lens-back distance (e.g. the flange-back distance of the lens barrel OP, i.e. the distance from the lens-mount surface to the film surface). This helps simplify the lens design and reduce the front-rear dimension of the camera.

The film format used in the Advanced Photo System (APS) is smaller in size than those used for 135 cameras. Accordingly, cameras designed for the Advanced Photo System have shorter lens-back distances than 135 cameras. For example, if we assume that the lens-back distance is x1 in an APS camera and x2 in a 135 camera, then x1<x2. Hence, if two mirrors are incorporated in the body of the APS camera, it will have a lens-back distance x3 such that x1<x2<x3. However, the third embodiment makes it possible to reduce this lens-back distance x3 down to x2, and thus allows cameras designed for the Advanced Photo System to use interchangeable lenses for 135 cameras.

Figure 17A:
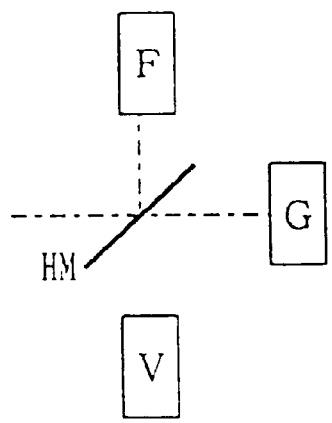
FIGS. 17A and 17B are optical path diagrams showing the basic construction of a conventional example.
Figure 17B:
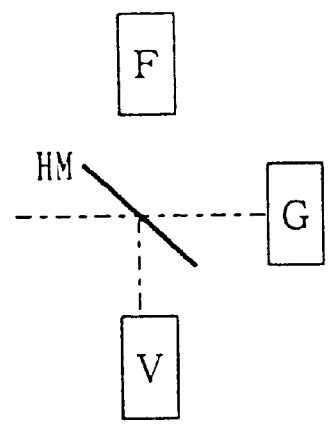

Next, a description will be given of the placement of the distance measurement device SE and other components in the mirror box MB. In the third embodiment, the distance measurement device SF and the AF mirror SM are placed in the same way as in ordinary single-lens reflex cameras. Such ordinary placement is possible because, in this embodiment, optical paths are manipulated partly by one mirror PM and partly by another mirror RM. In contrast, in the conventional arrangement described earlier and shown in FIGS. 17A and 17B, since the half mirror HM is rotatable, it is impractical to place the distance measurement device above or below the mirror box, because the presence of a drive mechanism for rotating the half mirror HM imposes various restrictions on the placement of the distance measurement device and of the AF mirror, and because the driving of the AF mirror in such a situation requires a complex mechanism. Instead, if the distance measurement device is placed by the side of the mirror box, then the retraction of the AF mirror requires a complex mechanism and, in addition, it is difficult to secure space for the retracting motion of the AF mirror.

Moreover, in this embodiment, the pellicle mirror PM used to split a light flux is of a fixed type. This makes it possible to realize a camera capable of both silver-halide shooting and video shooting by the use of a mirror box substantially the same size as those used in ordinary single-lens reflex cameras. In contrast, in the conventional arrangement described earlier and shown in FIGS. 17A and 17B, it is necessary to use a considerably large half mirror HM, since an unduly small half mirror HM causes eclipse in the light flux directed to the silver-halide shooting system G when a large-aperture interchangeable lens is used. Since the half mirror HM is rotated to switch optical paths, a larger half mirror HM requires a larger mirror box, which inevitably makes the camera as a whole accordingly larger.

Next, a description will be given of the locations at which optical paths are manipulated. In the third embodiment, manipulation, such as light flux splitting and optical path switching, of the light flux L0 is done within the camera body BO. If light flux splitting and optical path switching are done within the taking lens TL, the taking lens TL needs to be larger and more complex (e.g. an image-sensing device needs to be fitted on the outer surface of the lens barrel of an interchangeable lens), and also focusing is affected by manipulation of optical paths. In contrast, if light flux splitting and optical path switching are done within the camera body BO, it is possible to use an ordinary taking lens, that is, one of ordinary interchangeable lenses (e.g. readily available interchangeable lenses for the 135 format).

Next, with reference to Table 4, a description will be given of the shooting modes available in the third embodiment, in particular in terms of how the mirrors are controlled in each mode, and which systems are used in each mode and how. In the third embodiment, as in the first embodiment, three systems G, V, and F are provided. Accordingly, the EVF 18 and the optical viewfinder system F can each be used as an object observation system, whereas the silver-halide shooting system G and the video shooting system V can each be used as a shooting system.

Moreover, like the first embodiment, the third embodiment allows images to be recorded in silver-halide formats including the 135 format and the IX 240 format (for the Advanced Photo System) as well as in video formats including the moving-picture and still-picture formats. In table 4, "OVF" represents the optical viewfinder system F, and the symbols "○" and "x", as well as "B", "S1", "S2", and "S3" attached to "○", have the same meanings as in Table 2.

Shooting mode 1 is a mode in which video moving-picture shooting, video still-picture shooting, silver-halide shooting, or concurrent video moving-picture and silver-halide shooting can be performed while the object is being observed on the EVF 18 and through the optical viewfinder system F. Since this mode allows simultaneous use of the EVF 18 and the optical viewfinder system F as object observation systems, if, for example, the EVF 18 is designed to be movable to the taking lens TL side, the object image can be observed simultaneously through the optical viewfinder system F by the camera operator and on the EVF 18 by the person to be photographed. Moreover, it is also possible to provide the camera with an additional means for detecting whether the user is looking through the optical viewfinder system F. This makes it possible to invoke shooting mode 3 described later and turn off the EVF 18 when the operator is found to be looking through the optical viewfinder system F.

When the shooting mode button S0 (FIG. 3) is pressed a few times to set the shooting mode to "1", the camera is put into a standby (ready-for-shooting) state. At this time, the rotatable mirror RM (M2) is held in position PA. When the rotatable mirror RM is in position PA, the optical viewfinder system F receives the fourth light flux L4 (whose light amount is 33% or more of the light flux L0), and therefore the optical viewfinder system F can be used as an object observation system. In this way, since the systems F and V can be used simultaneously, it is possible to perform video shooting while observing the object through the optical viewfinder system F. On the other hand, through the light flux splitting function of the pellicle mirror PM, the video shooting system V receives the first light flux L1 (whose light amount is 33% of the light flux L0), the EVF 18 can also be used as an object observation system. In the standby state, the EVF 18 displays an image of the object.

When, in the standby state, the video button S1 (FIG. 3) is pressed, operations for shooting a video moving picture are started, so that a video moving picture of the object is recorded on the recording medium 17. When, in the middle of moving-picture shooting, the video button S1 is pressed again, the operations for video moving-picture shooting are stopped. When, in the standby state, the still-picture button S2 (FIG. 3) is pressed, operations for shooting a video still picture are performed, so that a video still picture of the object is recorded on the recording medium 17.

When, in the standby state or in the middle of moving-picture shooting, the shutter release button S3 (FIG. 3) is pressed, operations for shooting a silver-halide picture are performed. As a result, the rotatable mirror RM moves from position PA to PB and then back to PA, just like an ordinary quick-return mirror. Meanwhile, first, when the rotatable mirror RM moves to position PB (i.e. to the retracted position), the silver-halide shooting system G receives the third light flux L3; next, the shutter 4 is released, so that the third light flux L3 (whose light amount is 67% of the light flux L0) having entered the silver-halide shooting system G achieves the exposure of the film 5; then, when the exposure of the film 5 is complete, the rotatable mirror RM returns from position PB to position PA (i.e. to the ordinary position). Note that, when the rotatable mirror RM is in position PB, the optical viewfinder system F is subjected to a blackout but the EVF 18 is not. Note also that, since the systems G and V can be used simultaneously, silver-halide shooting is possible in the middle of video moving-picture shooting.

Shooting mode 2 is a mode in which simultaneous silver-halide and video still-picture shooting can performed while the object is being observed on the EVF 18 and through the optical viewfinder system F. Accordingly, this mode provides "release-views" as described earlier. Like shooting mode 1 described above, this mode allows simultaneous use of the EVF 18 and the optical viewfinder system F as object observation systems. Accordingly, if, for example, the EVF 18 is designed to be movable to the taking lens TL side, the object image can be observed simultaneously through the optical viewfinder system F by the camera operator and on the EVF 18 by the person to be photographed. Moreover, it is also possible to provide the camera with an additional means for detecting whether the user is looking through the optical viewfinder system F. This makes it possible to invoke shooting mode 4 described later and turn off the EVF 18 when the operator is found to be looking through the optical viewfinder system F.

When the shooting mode button S0 (FIG. 3) is pressed a few times to set the shooting mode to "2", the camera is put into a standby (ready-for-shooting) state. At this time, just as in shooting mode 1 described above, the rotatable mirror RM (M2) is held in position PA, and the EVF 18 displays an image of the object. When, in the standby state, the still-picture button S2 or the shutter release button S3 is pressed, operations for shooting a silver-halide picture and operations for shooting a video still picture are performed simultaneously. As a result, the rotatable mirror RM moves from position PA to PB and then back to PA, just like an ordinary quick-return mirror.

Meanwhile, first, when the rotatable mirror RM moves to position PB (i.e. to the retracted position), the silver-halide shooting system G receives the third light flux L3; next, the shutter 4 is released, so that the third light flux L3 (whose light amount is 67% of the light flux L0) having entered the silver-halide shooting system G achieves the exposure of the film 5; then, when the exposure of the film 5 is complete, the rotatable mirror RM returns from position PB to position PA (i.e. to the ordinary position). Note that, when the rotatable mirror RM is in position PB, the optical viewfinder system F is subjected to a blackout but the EVF 18 is not.

On the other hand, in the video shooting system V, a signal generated when the still-picture button S2 or the shutter release button S3 is pressed causes the CCD 14 to start photoelectric conversion (to produce a video still picture) simultaneously with the releasing of the shutter 4. The exposure of the CCD 14 is controlled by the relay aperture diaphragm 11, the ND filter 12, and an electronic shutter. In this way, it is possible to obtain a video still picture that is substantially identical with the corresponding silver-halide picture formed as a latent image on the film 5.

Shooting mode 3 is a mode in which video moving-picture shooting, video still-picture shooting, silver-halide shooting, or concurrent video moving-picture and silver-halide shooting can be performed while the object is being observed only through the optical viewfinder system F. In this mode, the EVF 18 is not used as an object observation system. Accordingly, this mode allows power-saving video shooting, i.e. video shooting in which electric power is not wasted, and also power-saving silver-halide shooting, i.e. silver-halide shooting in which electric power is not wasted.

Since this mode is the same as shooting mode 1 except that only the optical viewfinder system F is used as an object observation system, the description of the operation control performed in this mode will be omitted.

Shooting mode 4 is a mode in which simultaneous silver-halide and video still-picture shooting can be performed while the object is being observed only through the optical viewfinder system F. Accordingly, this mode provides "release-views" as described earlier. In addition, since this mode keeps the EVF 18 out of operation, it allows power-saving simultaneous silver-halide and video still-picture shooting in which electric power is not wasted. Since this mode is the same as shooting mode 2 except that only the optical viewfinder system F is used as an object observation system, the description of the operation control performed in this mode will be omitted.

Shooting mode 5 is a mode in which video moving-picture shooting, video still-picture shooting, silver-halide shooting, or concurrent video moving-picture and silver-halide shooting can be performed while the object is being observed only on the EVF 18. When the shooting mode button S0 (FIG. 3) is pressed a few times to set the shooting mode to "5", the camera is put into a standby (ready-for-shooting) state. At this time, the rotatable mirror RM (M2) is held in position PB. When the rotatable mirror RM is in position PB, the optical viewfinder system F does not receive the fourth light flux L4, and therefore only the EVF 18 can be used as an object observation system. On the other hand, the video shooting system V receives the first light flux L1 (whose light amount is 33% of the light flux L0), and therefore, in the standby state, the EVF 18 displays an image of the object.

When, in the standby state, the video button S1 (FIG. 3) is pressed, operations for shooting a video moving picture are started, so that a video moving picture of the object is recorded on the recording medium 17. When, in the middle of moving-picture shooting, the video button S1 is pressed again, the operations for video moving-picture shooting are stopped. When, in the standby state, the still-picture button S2 (FIG. 3) is pressed, operations for shooting a video still picture are performed, so that a video still picture of the object is recorded on the recording medium 17. When, in the standby state or in the middle of moving-picture shooting, the shutter release button S3 (FIG. 3) is pressed, operations for shooting a silver-halide picture are performed. As a result, the shutter 4 is released, and this causes the third light flux L3 (whose light amount is 67% of the light flux L0) to enter the silver-halide shooting system G to achieve the exposure of the film 5. In this way, since the systems G and V can be used concurrently, it is possible to take silver-halide shots in the middle of video moving-picture shooting.

Shooting mode 6 is a mode in which simultaneous silver-halide and video still-picture shooting can be performed while the object is being observed only on the EVF 18. Accordingly, this mode provides "release-views" as described earlier. When the shooting mode button S0 (FIG. 3) is pressed a few times to set the shooting mode to "6", the camera is put into a standby (ready-for-shooting) state. At this time, just as in shooting mode 5 described above, the rotatable mirror RM (M2) is held in position PB. When the rotatable mirror RM is in position PB, the optical viewfinder system F does not receive the fourth light flux L4, and therefore only the EVF 18 can be used as an object observation system. On the other hand, the video shooting system V receives the first light flux L1 (whose light amount is 33% of the light flux L0), and therefore, in the standby state, the EVF 18 displays an image of the object.

When, in the standby state, the still-picture button S2 or the shutter release button S3 is pressed, operations for shooting a silver-halide picture and operations for shooting a video still picture are performed simultaneously. As a result, in the silver-halide shooting system G, the shutter 4 is released, and this causes the third light flux L3 (whose light amount is 67% of the light flux L0) to enter the silver-halide shooting system G to achieve the exposure of the film 5; on the other hand, in the video shooting system V, a signal generated when the still-picture button S2 or the shutter release button S3 is pressed causes the CCD 14 to start photoelectric conversion (to produce a video still picture) simultaneously with the releasing of the shutter 4. The exposure of the CCD 14 is controlled by the relay aperture diaphragm 11, the ND filter 12, and an electronic shutter. In this way, it is possible to obtain a video still picture that is substantially identical with the corresponding silver-halide picture formed as a latent image on the film 5.

Figure 12:
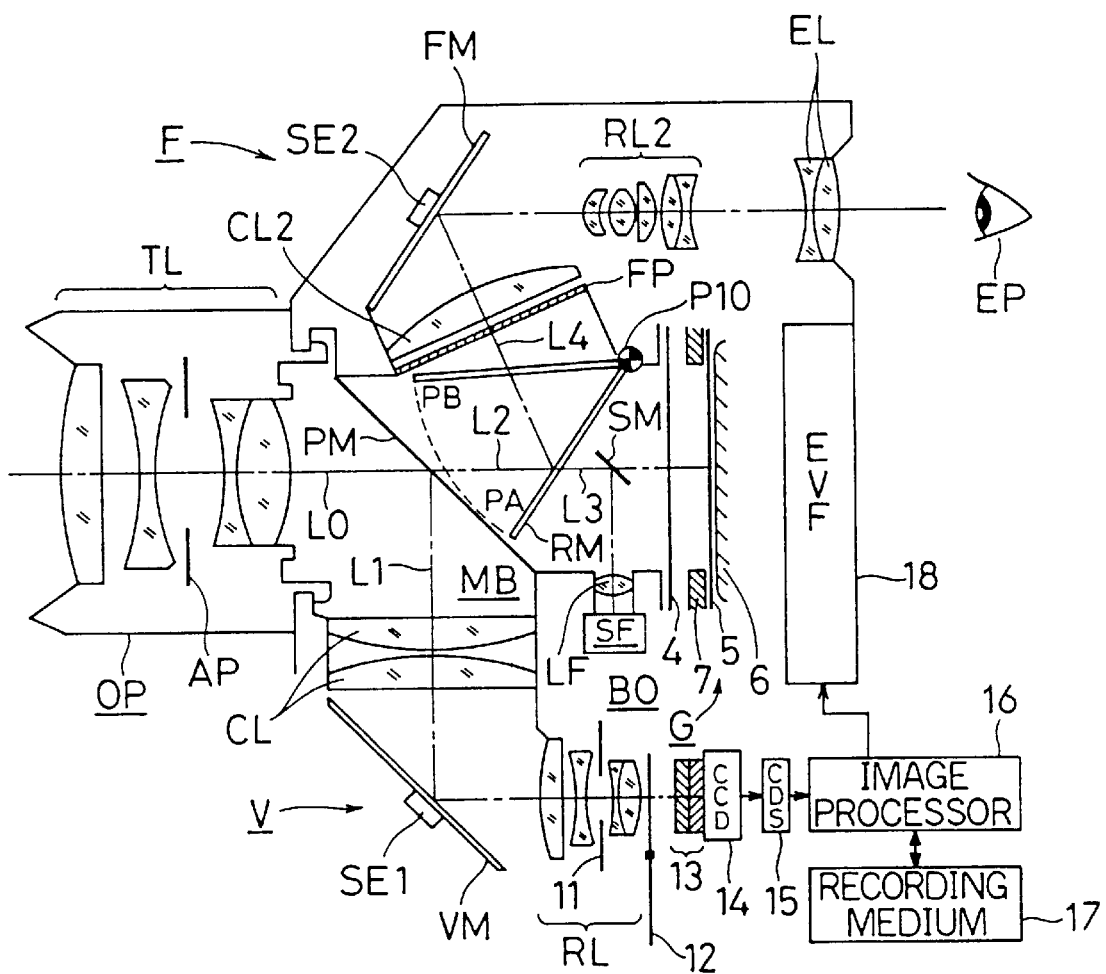
FIG. 12 is a diagram schematically showing the internal construction of a modified example of the third embodiment.

A Modified Example of the Third Embodiment
(FIG. 12)

Figure 13:
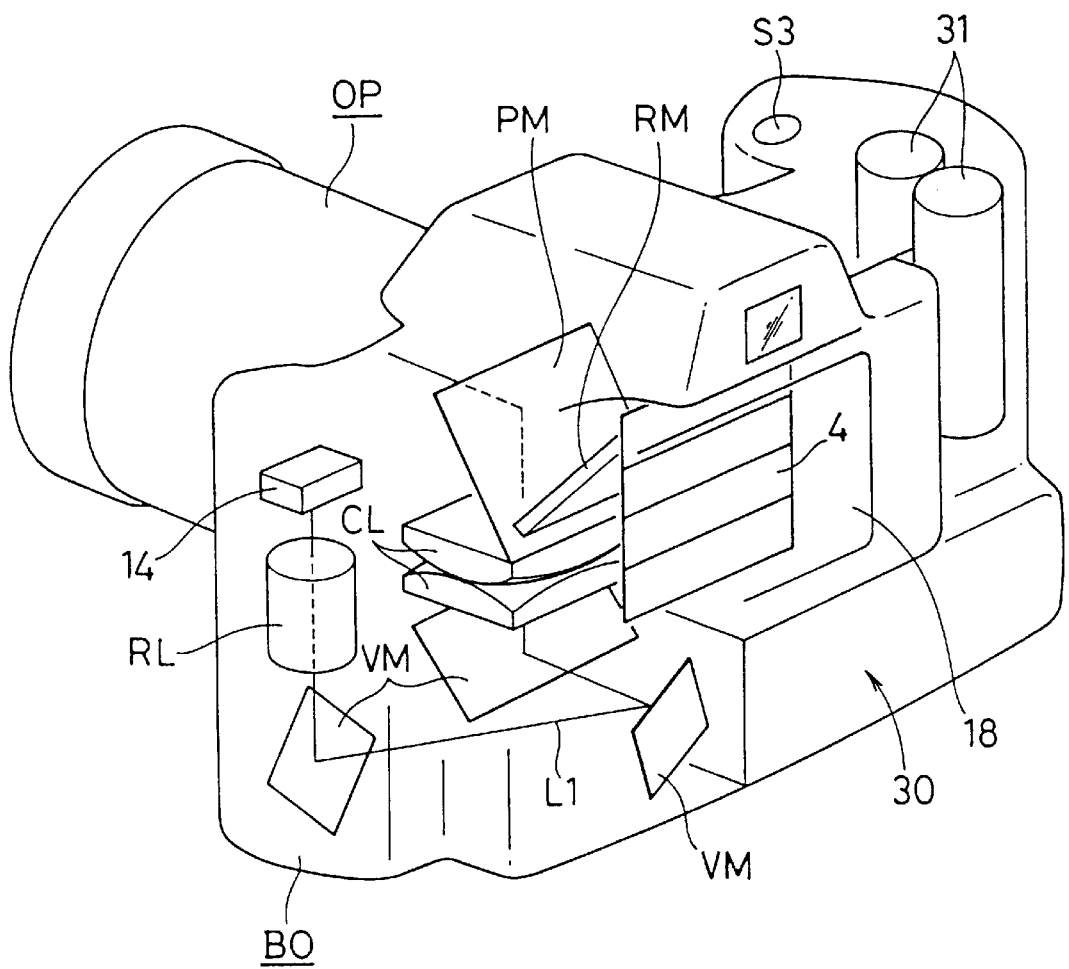
FIG. 13 is a diagram perspectively showing the internal construction of the modified example of the third embodiment as seen obliquely from the top-rear side.
Figure 14:
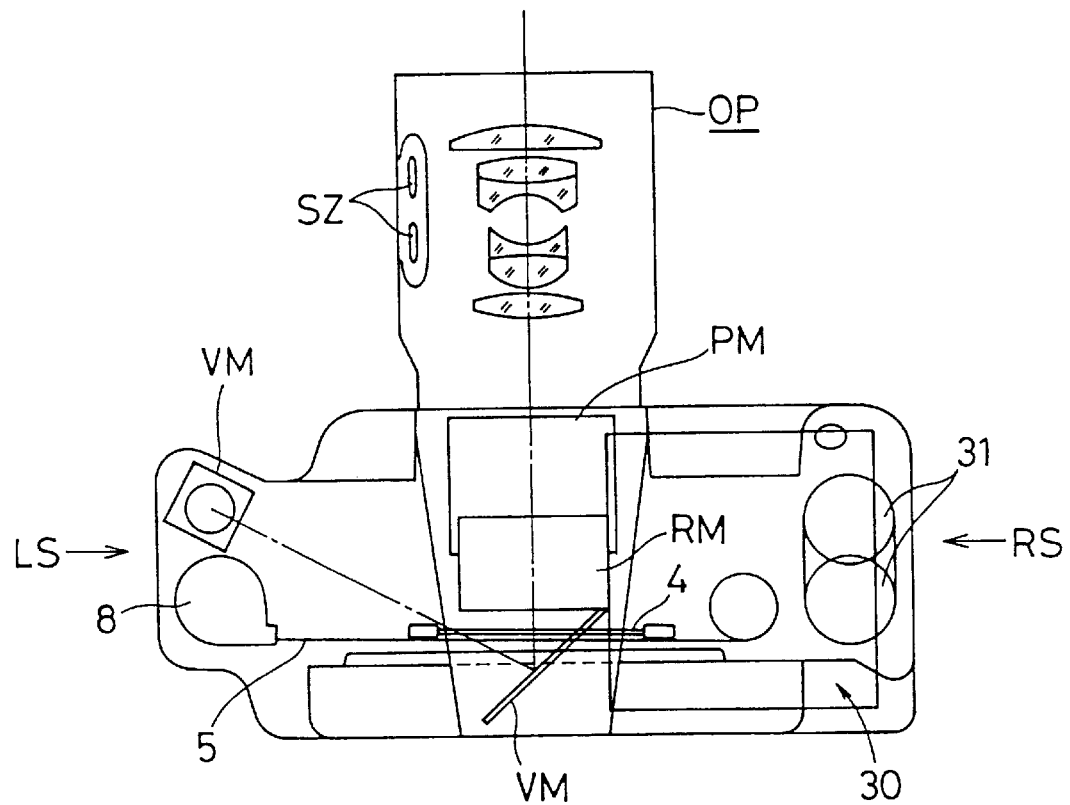
FIG. 14 is a diagram perspectively showing the internal construction of the modified example of the third embodiment as seen from the top.
Figure 15:
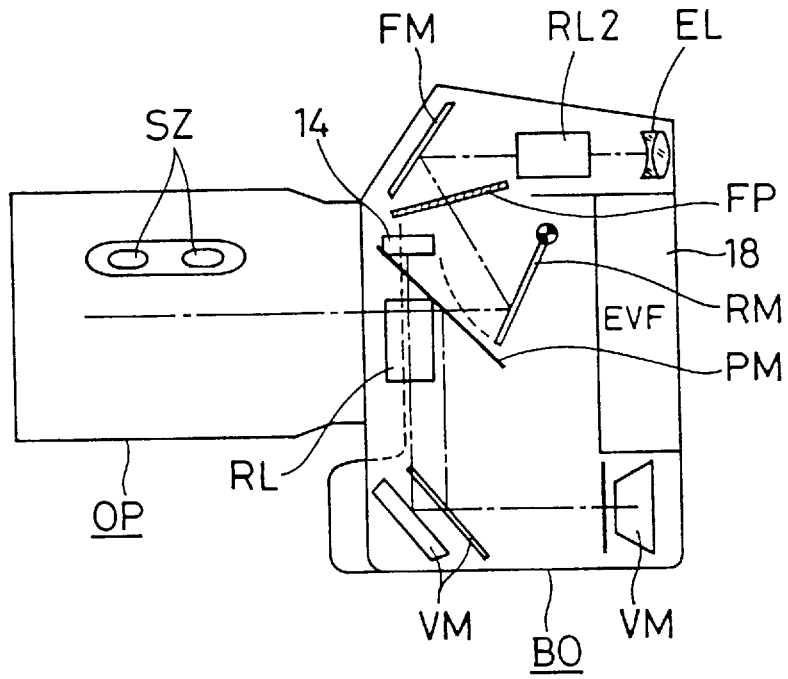
FIG. 15 is a diagram perspectively showing the internal construction of the modified example of the third embodiment as seen from the direction LS in FIG. 14.

FIG. 12 schematically shows the internal construction of a modified example of the third embodiment. In FIG. 12, each of the light flux L0 to L4 is represented by a paraxial ray. FIG. 13 perspectively shows the internal construction of this camera as seen obliquely from the top-rear side. FIG. 14 perspectively shows the internal construction of this camera as seen from the top. FIG. 15 perspectively shows the internal construction of this camera as seen from the direction LS in FIG. 14, and FIG. 16 perspectively shows the internal construction of this camera as seen from the direction RS in FIG. 14. The camera of this modified example has the same external appearance as the camera of the third embodiment (FIG. 3), and uses the same operation control in each shooting mode as that camera. Accordingly, to omit overlapping descriptions, only the parts in which this modified example differs from the third embodiment will be described below.

The lens barrel OP is removably attached to the camera body BO through a bayonet mount. Accordingly, the taking lens TL can be selected from a wide choice of interchangeable lenses in accordance with the needs on a particular shooting occasion. The optical viewfinder system F is of a so-called Kepler type, and is composed of a focusing screen FP, a condenser lens CL2, a relay lens RL2, and an eyepiece lens EL, and others. A photometry device SE1 is provided on the rear surface of one reflection mirror VM, and another photometry device SE2 is provided on the rear surface of the other reflection mirror FM. The photometry device SE1 is used for brightness adjustment, and is used also in silver-halide shooting when the rotatable mirror RM is up in position PB. The photometry device SE2 is used in silver-halide shooting when the rotatable mirror RM is down in position PA.

In this modified example, the pellicle mirror PM is so placed as to make an angle of about 45° to the optical axis of the taking lens TL (represented by the dash-dot line indicating the light flux L0), and the rotatable mirror RM is placed in such a way that, when the optical path for the fourth light flux L4 is selected, the fourth light flux L4 travels obliquely toward the taking lens TL. Specifically, here, the rotatable mirror RM makes an angle of 55° to the optical axis of the taking lens TL. As a result, between the taking lens TL and the optical viewfinder system F, light travels along a Z-shaped optical path, that is, a "Z optical system" is formed. Owing to this construction, the lens-back distance can be made still shorter than in the third embodiment. This not only helps simplify the lens design, but also makes it even easier to realize Advanced Photo System cameras that can be used in combination of interchangeable lenses for 135 cameras.

Figure 16:
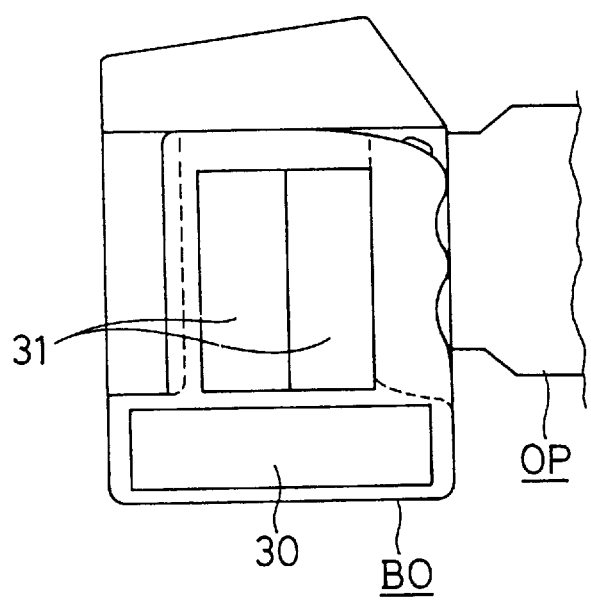
FIG. 16 is a diagram perspectively showing the internal construction of the modified example of the third embodiment as seen from the direction RS in FIG. 14.

In FIGS. 13, 14, and 16, numeral 30 represents a digital videocassette deck, and numeral 31 represents a battery. Note that also the third embodiment is provided with a digital videocassette deck 30 and a battery 31 in the same way. Thus, when performing video shooting, the cameras of this modified example and of the third embodiment function as a DVC (digital video camera) that records and reproduces images in a "DV" (digital video) format by the use of the digital videocassette deck 30. In FIGS. 14 and 15, SZ represents a pair of zoom buttons. When one of these zoom buttons is pressed, zooming is performed in one direction, and, when the other is pressed, zooming is performed in the opposite direction.

In this modified example, as well as in the third embodiment, in a plane including the optical paths of the first and second light flux L1 and L2, and with respect to the second light flux L2, the first and fourth light flux L1 and L4 travel in the opposite directions to each other. As a result, even if two mirrors are arranged on an extension line of the optical axis of the taking lens TL, the lens-back distance is relatively short. This not only helps simplify the lens design, but also prevents the camera body from being made larger.

Figure 7:
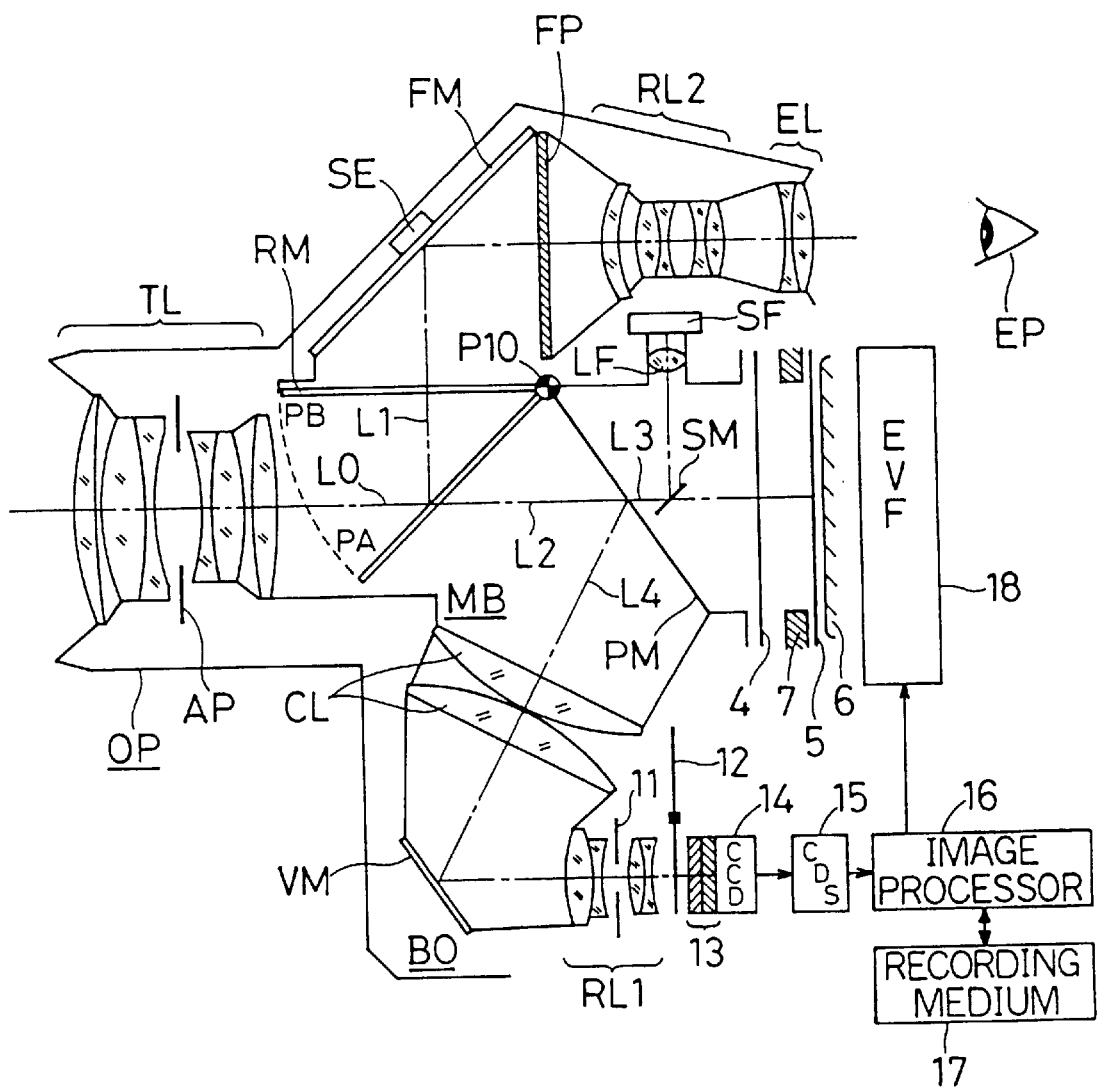
FIG. 7 is a diagram schematically showing the internal construction of the fourth embodiment.

FIG. 7 schematically shows the internal construction of the camera of the fourth embodiment. This camera adopts construction type No. 7 (Table 1, FIG. 2) described earlier. In FIG. 7, each of the light flux L0 to L4 is represented by a paraxial ray.

A taking lens TL is housed in a lens barrel OP with such a lens-back distance that allows the light traveling from an object through the taking lens TL to be focused to form an image on the surface of a film 5. The lens barrel OP is formed as a single unit with a camera body BO, though it is also possible to design the lens barrel OP to be interchangeable as in the first embodiment.

Inside the camera body BO, a mirror box MB is provided for supporting a rotatable mirror RM, a pellicle mirror PM, an AF mirror SM, and other components. The rotatable mirror RM corresponds to the mirror M1 described earlier, and can be positioned either in position PA or in position PB by its rotation through a predetermined angle about a rotation axis P10. By switching the position of the rotatable mirror RM between positions PA and PB, the subsequent optical path of the light flux L0 having passed through the taking lens TL is switched between the optical path of a reflected light flux (a first light flux) L1 and that of a straight light flux (a second light flux) L2.

When the rotatable mirror RM is in position PA, the light flux L0 is reflected by the rotatable mirror RM, and the thus reflected light flux (the first light flux L1) enters the optical viewfinder system F. The optical viewfinder system F is provided with, from the rotatable mirror RM side, a reflection mirror FM, a focusing screen FP, a relay lens RL2, and an eyepiece lens EL. The focusing screen FP is placed at the position where the first light flux L1 is focused to form an image. The focusing screen FP is of the type used in ordinary single-lens reflex cameras, and is composed of a dispersion plate that scatters light rays all the time. The object image formed on the focusing screen FP is directed by the relay lens RL2 to the eyepiece lens EL so as to be observed by the user's pupil EP. This allows the user to adjust focus manually while observing the object through the optical viewfinder system F. On the rear surface of the reflection mirror FM, a photometry device SE is placed in a position from which it can look over the object image formed on the focusing screen FP (the reflection mirror FM has a half-mirror portion formed in the area where the photometry device SE is placed at the rear). The photometry device SE outputs AE (autoexposure) information, based on which automatic exposure is controlled.

To direct part of the light flux L0 to the AF mirror SM, the rotatable mirror RM has a half-mirror portion and a total-reflection-mirror portion (it may be designed to be a whole-surface half mirror). The reflectance of the rotatable mirror RM is 33% or more. Accordingly, when the rotatable mirror RM is in position PA, the optical viewfinder system F receives 33% or more of the light flux L0. Thus, the light distribution proportion for the optical viewfinder system F satisfies the condition noted earlier: 30 to 50% of the light flux L0.

When the rotatable mirror RM is in position PB, the light flux L0 directly enters the pellicle mirror PM as the second light flux L2. The pellicle mirror PM corresponds to the mirror M2 described earlier, and serves to split the second light flux L2 into a transmitted light flux (a third light flux) L3 and a reflected light flux (a fourth light flux) L4. The light distribution proportion (transmittance) for the third light flux L3, which is directed to a shutter 4 (i.e. to a silver-halide shooting system G), is 67%, and the light distribution proportion (reflectance) for the fourth light flux L4, which is directed to a condenser lens CL (i.e. to a video shooting system V), is 33%. Thus, the light distribution proportions for the silver-halide shooting system G and the video shooting system V satisfy the conditions noted earlier: 50 to 70% to the silver-halide shooting system G, and 30 to 50% to the video shooting system V.

The silver-halide shooting system G is placed behind the mirror box MB. In the silver-halide shooting system G, to keep the film 5 at the position where the third light flux L3 forms an image, a shutter 4 and film rails 7 are provided in front of the film 5, and a film-pressing plate 6 is provided behind the film 5. The shutter 4 controls the exposure of the film 5; the film rails 7 guide the film 5; the film-pressing plate 6 keeps the film 5 flat. The image formed on the surface of the film 5 is recorded through the process of silver-halide photography (i.e. by exposing the film 5 to a focused object image), just as in ordinary single-lens reflex cameras. Of course, any light-sensitive recording medium designed for silver-halide photography can be used instead of the film 5.

The AF mirror SM is placed between the pellicle mirror PM and the shutter 4. When the rotatable mirror RM is in position PA, the part of the light flux L0 that has passed through the above-mentioned half-mirror portion of the rotatable mirror RM passes through the pellicle mirror PM, and is then reflected by the AF mirror SM toward the top of the mirror box MB. The thus reflected light flux is focused by an imaging lens LF to form an image on a distance measurement device SF. The distance measurement device SF is composed, for example, of a line CCD, and outputs AF (autofocus) information, based on which automatic focusing is controlled. The AF mirror SM is designed to be retractable so that it can be kept out of the optical path of the third light flux L3 during film exposure.

The video shooting system V is provided with, from the pellicle mirror PM side, a condenser lens CL, a reflection mirror VM, a relay lens RL1, an ND filter 12, an IR-cut filter/optical low-pass filter 13, a CCD 14 serving as an image-sensing device, a correlative double sampling circuit (CDS) 15, an image processor 16, a recording medium 17, and an EVF 18.

The fourth light flux L4 is directed by the pellicle mirror PM to the condenser lens CL, is then condensed by the condenser lens CL, and is then directed by the reflection mirror VM to the relay lens RL1. This relay lens RL1 is provided with a relay aperture diaphragm 11, which serves to adjust the exposure amount for the CCD 14. In addition, the ND filter 12, which is placed behind the relay lens RL1, also serves to adjust the exposure amount for the CCD 14. After passing through the relay lens RL1 and the ND filter 12, the fourth light flux L4 passes through the IR-cut filter/optical low-pass filter 13 for cutting infrared radiation and for preventing moiré fringes, and is then focused to form an image on the light-receiving surface of the CCD 14.

The thus formed image is then converted into an analog electrical signal through photoelectric conversion by the CCD 14 and through sampling by the CDS 15. This analog signal is then converted into luminance and chrominance signals through analog-to-digital conversion and other processing by the image processor 16. The signals outputted from the image processor 16 are fed to the EVF 18. The EVF 18 is a monitor device composed of a liquid crystal display panel, and is provided on the rear surface of the camera body BO (FIG. 3). When, in the standby state of certain shooting modes, the recording control operation unit is operated (e.g. when the video button S1 is operated), the above signals outputted from the image processor 16 are recorded on the recording medium 17 (e.g. a videocassette tape). Through operation of a playback control operation unit (not shown), images (moving and still pictures) recorded on the recording medium 17 can be reproduced and displayed on the EVF 18.

Next, with reference to Table 5, a description will be given of the shooting modes available in the fourth embodiment, in particular in terms of how the mirrors are controlled in each mode, and which systems are used in each mode and how. In the fourth embodiment, as in the first embodiment, three systems G, V, and F are provided. Accordingly, the EVF 18 and the optical viewfinder system F can each be used as an object observation system, whereas the silver-halide shooting system G and the video shooting system V can each be used as a shooting system.

Moreover, like the first embodiment, the fourth embodiment allows images to be recorded in silver-halide formats including the 135 format and the IX 240 format (for the Advanced Photo System) as well as in video formats including the moving-picture and still-picture formats. In table 5, "OVF" represents the optical viewfinder system F, and the symbols "○" and "x", as well as "B", "S1", "S2", and "S3" attached to "○", have the same meanings as in Table 2.

Shooting mode 1 is a mode in which video moving-picture shooting, video still-picture shooting, silver-halide shooting, or concurrent video moving-picture and silver-halide shooting can be performed while the object is being observed on the EVF 18. When the shooting mode button S0 (FIG. 3) is pressed a few times to set the shooting mode to "1", the camera is put into a standby (ready-for-shooting) state. At this time, the rotatable mirror RM (M1) is held in position PB. When the rotatable mirror RM is in position PB, the video shooting system V receives the fourth light flux L4 (whose light amount is 33% of the light flux L0), and therefore only the EVF 18 can be used as an object observation system. In the standby state, the EVF 18 displays an image of the object.

When, in the standby state, the video button S1 (FIG. 3) is pressed, operations for shooting a video moving picture are started, so that a video moving picture of the object is recorded on the recording medium 17. When, in the middle of moving-picture shooting, the video button S1 is pressed again, the operations for video moving-picture shooting are stopped. When, in the standby state, the still-picture button S2 (FIG. 3) is pressed, operations for shooting a video still picture are performed, so that a video still picture of the object is recorded on the recording medium 17. When, in the standby state or in the middle of moving-picture shooting, the shutter release button S3 (FIG. 3) is pressed, operations for shooting a silver-halide picture are performed. As a result, the shutter 4 is released, and this causes the third light flux L3 (whose light amount is 67% of the light flux L0) to enter the silver-halide shooting system G to achieve the exposure of the film 5. In this way, since the systems G and V can be used concurrently, it is possible to take silver-halide shots in the middle of video nmoving-picture shooting.

Shooting mode 2 is a mode in which simultaneous silver-halide and video still-picture shooting can be performed while the object is being observed on the EVF 18. Accordingly, this mode provides "release-views" as described earlier. When the shooting mode button S0 (FIG. 3) is pressed a few times to set the shooting mode to "2", the camera is put into a standby (ready-for-shooting) state. At this time, just as in shooting mode 1 described above, the rotatable mirror RM (M1) is held in position PB. When the rotatable mirror RM is in position PB, the video shooting system V receives the fourth light flux L4 (whose light amount is 33% of the light flux L0), and therefore only the EVF 18 can be used as an object observation system. In the standby state, the EVF 18 displays an image of the object.

When, in the standby state, the still-picture button S2 or the shutter release button S3 is pressed, operations for shooting a silver-halide picture and operations for shooting a video still picture are performed simultaneously. As a result, in the silver-halide shooting system G, the shutter 4 is released, and this causes the third light flux L3 (whose light amount is 67% of the light flux L0) to enter the silver-halide shooting system G to achieve the exposure of the film 5; on the other hand, in the video shooting system V, a signal generated when the still-picture button S2 or the shutter release button S3 is pressed causes the CCD 14 to start photoelectric conversion (to produce a video still picture) simultaneously with the releasing of the shutter 4. The exposure of the CCD 14 is controlled by the relay aperture diaphragm 11, the ND filter 12, and an electronic shutter. In this way, it is possible to obtain a video still picture that is substantially identical with the corresponding silver-halide picture formed as a latent image on the film 5.

Shooting mode 3 is a mode in which video still-picture shooting or silver-halide shooting can be performed while the object is being observed through the optical viewfinder system F. In this mode, the EVF 18 is kept out of operation so that electric power is not wasted, that is, this mode allows power-saving silver-halide shooting and power-saving video still-picture shooting. When the shooting mode button S0 is pressed a few times to set the shooting mode to "3", the camera is put into a standby (ready-for-shooting) state. At this time, the rotatable mirror RM (M1) is held in position PA. When the rotatable mirror RM is in position PA, the optical viewfinder system F receives the first light flux L1 (whose light amount is 33% of the light flux L0), and therefore only the optical viewfinder system F can be used as an object observation system.

When, in the standby state, the shutter release button S3 is pressed, operations for shooting a silver-halide picture are performed. As a result, the shutter 4 is released, and this causes the third light flux L3 (whose light amount is 67% of the light flux L0) to enter the silver-halide shooting system G to achieve the exposure of the film 5. When, in the standby state, the still-picture button S2 is pressed, operations for shooting a video still picture are performed. As a result, in response to a signal generated when the still-picture button S2 is pressed, the rotatable mirror RM moves from position PA to PB and then back to PA, just like an ordinary quick-return mirror. When the rotatable mirror RM moves to position PB (i.e. to the retracted position), the video shooting system V receives the fourth light flux L4 (whose light amount is 33% of the light flux L0), and the CCD 14 starts photoelectric conversion. The exposure of the CCD 14 is controlled by the relay aperture diaphragm 11, the ND filter 12, and an electronic shutter. When the exposure of the CCD 14 is complete, the rotatable mirror RM returns from position PB to PA (i.e. to the ordinary position). Note that, when the rotatable mirror RM is in position PB, the optical viewfinder system F is subjected to a blackout.

Shooting mode 4 is a mode in which simultaneous silver-halide and video still-picture shooting can be performed while the object is being observed through the optical viewfinder system F. Accordingly, this mode provides "release-views" as described earlier. In addition, in this mode, the EVF 18 is kept out of operation so that electric power will not be wasted, that is, this mode allows power-saving simultaneous silver-halide and video still-picture shooting. When the shooting mode button S0 is pressed a few times to set the shooting mode to "4", the camera is put into a standby (ready-for-shooting) state. At this time, just as in shooting mode 3 described above, the rotatable mirror RM (M1) is held in position PA. When the rotatable mirror RM is in position PA, the optical viewfinder system F receives the first light flux L1 (whose light amount is 33% of the light flux L0), and therefore only the optical viewfinder system F can be used as an object observation system.

When, in the standby state, the still-picture button S2 or the shutter release button S3 is pressed, operations for shooting a silver-halide picture and operations for shooting a video still picture are performed simultaneously. As a result, in the silver-halide shooting system G, the shutter 4 is released, and this causes the third light flux L3 (whose light amount is 67% of the light flux L0) to enter the silver-halide shooting system G to achieve the exposure of the film 5; on the other hand, in the video shooting system V, a signal generated when the still-picture button S2 or the shutter release button S3 is pressed causes the rotatable mirror RM to move from position PA to PB and then back to PA, like an ordinary quick-return mirror. When the rotatable mirror RM moves to position PB (i.e. to the retracted position), the video shooting system V receives the fourth light flux L4 (whose light amount is 33% of the light flux L0). The CCD 14 starts photoelectric conversion simultaneously with the releasing of the shutter 4. The exposure of the CCD 14 is controlled by the relay aperture diaphragm 11, the ND filter 12, and an electronic shutter. When the exposure of the CCD 14 is complete, the rotatable mirror RM returns from position PB to position PA (i.e. to the ordinary position). In this way, it is possible to obtain a video still picture that is substantially identical with the corresponding silver-halide picture formed as a latent image on the film 5. Note that, when the rotatable mirror RM is in position PB, the optical viewfinder system F is subjected to a blackout.

Figure 8:
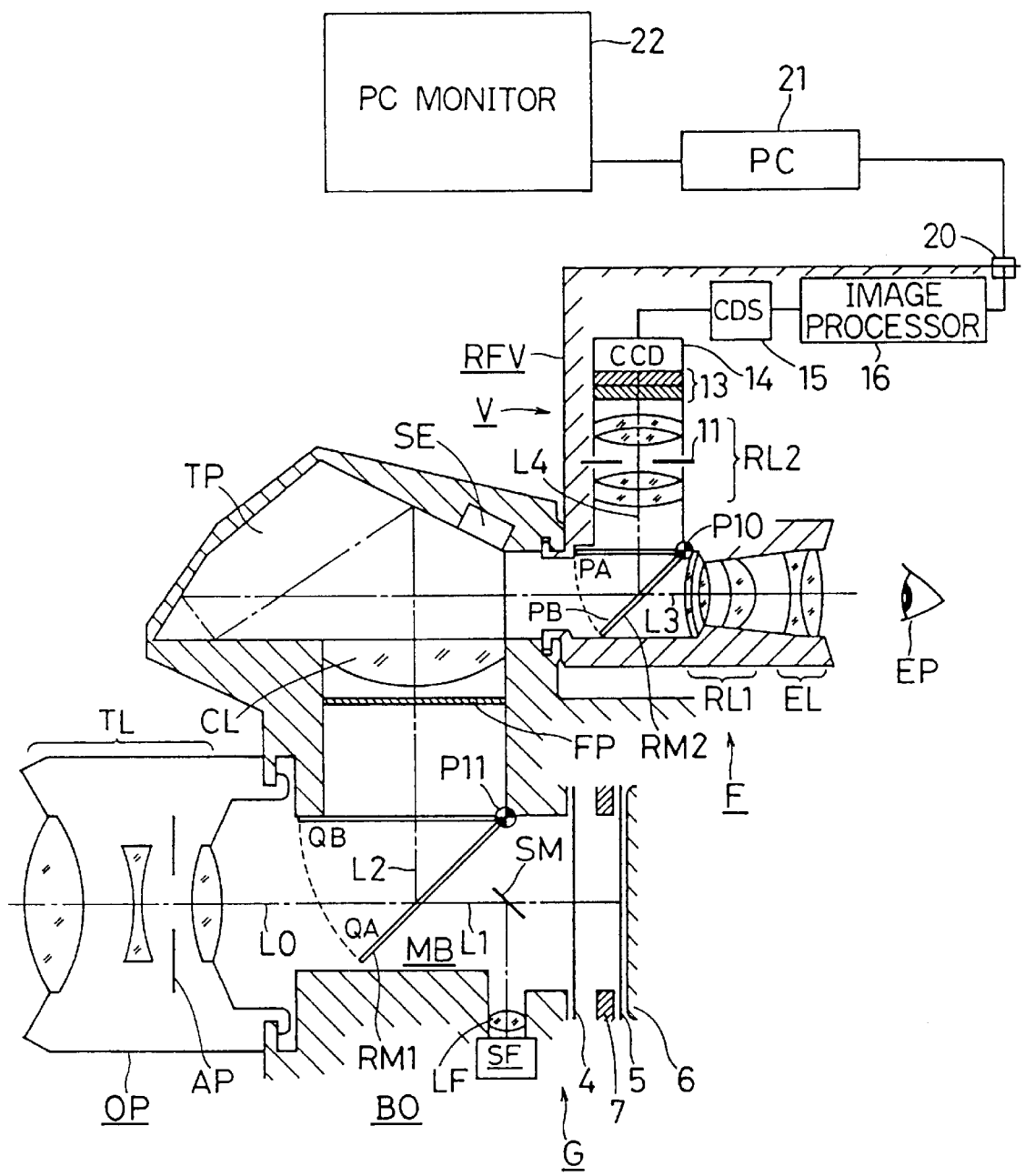
FIG. 8 is a diagram schematically showing the internal construction of the fifth embodiment.

FIG. 8 schematically shows the internal construction of the camera of the fifth embodiment. This camera adopts construction type No. 12 (Table 1, FIG. 2) described earlier. In FIG. 8, each of the light flux L0 to L4 is represented by a paraxial ray.

The fifth embodiment is the same as the second embodiment (FIG. 5) except that the former uses a rotatable mirror RM1 in place of the pellicle mirror PM of the latter. That is, to manipulate optical paths, the fifth embodiment uses two rotatable mirrors: RM1, which corresponds to the mirror M1 described earlier, and RM2, which corresponds to the mirror M2 described earlier and functions in the same way as the rotatable mirror RM of the second embodiment. Thus, the camera of the fifth embodiment has the same construction as that of the second embodiment except for the portions related to the rotatable mirror RM1. In addition, this camera has a camera body BO that is constructed in the same way as those for ordinary single-lens reflex cameras. Accordingly, to omit overlapping descriptions, only the rotatable mirror RM1 and the portions related thereto will be described below.

The rotatable mirror RM1 is a rotatable mirror of the type that is used in ordinary single-lens reflex cameras, and can be positioned either in position QA or in position QB by its rotation through a predetermined angle about a rotation axis P11. By switching the position of the rotatable mirror RM1 between positions QA and QB, the subsequent optical path of the light flux L0 having passed through the taking lens TL is switched between the optical path of a straight light flux (a first light flux) L1 and that of a reflected light flux (a second light flux) L2.

To direct part of the light flux L0 to the AF mirror SM, the rotatable mirror RM1 has a half-mirror portion and a total-reflection-mirror portion (it may be designed to be a whole-surface half mirror). The reflectance of the rotatable mirror RM1 is 50%. Accordingly, when the rotatable mirror RM1 is in position QA, the optical viewfinder system F or the video shooting system V receives 50% of the light flux L0. Thus, the light distribution proportions for the optical viewfinder system F and the video shooting system V satisfy the conditions noted earlier: 30 to 50% of the light flux L0 to each of the two systems.

Next, with reference to Table 6, a description will be given of the shooting modes available in the fifth embodiment, in particular in terms of how the mirrors are controlled in each mode, and which systems are used in each mode and how. In the fifth embodiment, as in the second embodiment, three systems G, V, and F are provided. Accordingly, the PC monitor 22 and the optical viewfinder system F can each be used as an object observation system, whereas the silver-halide shooting system G and the video shooting system V can each be used as a shooting system.

Moreover, like the second embodiment, the fifth embodiment allows images to be recorded in silver-halide formats including the 120 (220) format, the 135 format, and the IX 240 format (for the Advanced Photo System) as well as in video formats including the moving-picture and still-picture formats. In Table 6, "PCM" and "OVF" represent the PC monitor 22 and the optical viewfinder system F, respectively. Moreover, in Table 6, the symbols "o" and "x", as well as "B", "P", and "S3" attached to "o", have the same meanings as in Table 3.

Shooting mode 1 is a mode in which video moving-picture shooting or video still-picture shooting can be performed while the object is being observed on the PC monitor 22. When the shooting mode button S0 (provided on the removable viewfinder/video unit RFV) is pressed a few times to set the shooting mode to "1", the camera is put into a standby (ready-for-shooting) state. At this time, the rotatable mirror RM1 (M1) is held in position QA, and the rotatable mirror RM2 (M2) is held in position PB. When the rotatable mirror RM2 is in position PB, the video shooting system V receives the fourth light flux L4 (whose light amount is 50% of the light flux L0), and therefore only the PC monitor 22 can be used as an object observation system. In the standby state, the PC monitor 22 displays an image of the object.

When, in the standby state, the personal computer 21 is operated in a predefined way, operations for shooting a video moving picture are started, so that a video moving picture of the object is recorded on a recording medium (such as a disk) provided in the personal computer 21. The operations for video moving-picture shooting can be stopped by operating the personal computer 21 again. Video still-picture shooting can also be performed by operating the personal computer 21 in the standby state.

Shooting mode 2 is a mode in which video still-picture shooting can be performed while the object is being observed through the optical viewfinder system F. In this mode, the PC monitor 22 is kept out of operation so that electric power will not be wasted, that is, this mode allows power-saving video still-picture shooting. When the shooting mode button S0 is pressed a few times to set the shooting mode to "2", the camera is put into a standby (ready-for-shooting) state. At this time, the rotatable mirror RM1 (M1) is held in position QA, and the rotatable mirror RM2 (M2) is held in position PA. When the rotatable mirror RM2 is in position PA, the optical viewfinder system F receives the third light flux L3 (whose light amount is 50% of the light flux L0), and therefore only the optical viewfinder system F can be used as an object observation system.

When, in the standby state, the personal computer 21 is operated in a predefined way, operations for shooting a video still picture are started. As a result, in response to a signal generated when the personal computer 21 is operated, the rotatable mirror RM2 moves from position PA to PB and then back to PA, just like an ordinary quick-return mirror. When the rotatable mirror RM2 moves to position PB (i.e. to the retracted position), the video shooting system V receives the fourth light flux L4 (whose light amount is 50% of the light flux L0), and the CCD 14 starts photoelectric conversion. The exposure of the CCD 14 is controlled by the relay aperture diaphragm 11 and an electronic shutter. When the exposure of the CCD 14 is complete, the rotatable mirror RM2 returns from position PB to PA (i.e. to the ordinary position). Note that, when the rotatable mirror RM2 is in position PB, the optical viewfinder system F is subjected to a blackout.

Shooting mode 3 is a mode in which silver-halide shooting can be performed while the object is being observed on the PC monitor 22. When the shooting mode button S0 is pressed a few times to set the shooting mode to "3", the camera is put into a standby (ready-for-shooting) state. At this time, the rotatable mirror RM1 (M1) is held in position QA, and the rotatable mirror RM2 (M2) is held in position PB. When the rotatable mirror RM2 is in position PB, the video shooting system V receives the fourth light flux L4 (whose light amount is 50% of the light flux L0), and therefore only the PC monitor 22 can be used as an object observation system. In the standby state, the PC monitor 22 displays an image of the object.

When, in the standby state, the shutter release button S3 (FIG. 3) is pressed, operations for shooting a silver-halide picture are started. As a result, the rotatable mirror RM1 moves from position QA to QB and then back to QA, just like an ordinary quick-return mirror. Meanwhile, first, when the rotatable mirror RM1 moves to position QB (i.e. to the retracted position), the silver-halide shooting system G receives the first light flux L1; next, the shutter 4 is released, so that the first light flux L1 (whose light amount is almost 100% of the light flux L0) having entered the silver-halide shooting system G achieves the exposure of the film 5; then, when the exposure of the film 5 is complete, the rotatable mirror RM1 returns from position QB to position QA (i.e. to the ordinary position). Note that, when the rotatable mirror RM1 is in position QB, the PC monitor 22 is subjected to a blackout.

Shooting mode 4 is a mode in which silver-halide shooting can be performed while the object is being observed through the optical viewfinder system F. In this mode, the PC monitor 22 is kept out of operation so that electric power will not be wasted, that is, this mode allows power-saving silver-halide shooting. When the shooting mode button S0 is pressed a few times to set the shooting mode to "4", the camera is put into a standby (ready-for-shooting) state. At this time, the rotatable mirror RM1 (M1) is held in position QA, and the rotatable mirror RM2 (M2) is held in position PA. When the rotatable mirror RM2 is in position PA, the optical viewfinder system F receives the third light flux L3 (whose light amount is 50% of the light flux L0), and therefore only the optical viewfinder system F can be used as an object observation system.

When, in the standby state, the shutter release button S3 (FIG. 3) is pressed, operations for shooting a silver-halide picture are started. As a result, the rotatable mirror RM1 moves from position QA to QB and then back to QA, just like an ordinary quick-return mirror. Meanwhile, first, when the rotatable mirror RM1 moves to position QB (i.e. to the retracted position), the silver-halide shooting system G receives the first light flux L1; next, the shutter 4 is released, so that the first light flux L1 (whose light amount is almost 100% of the light flux L0) having entered the silver-halide shooting system G achieves the exposure of the film 5; then, when the exposure of the film 5 is complete, the rotatable mirror RM1 returns from position QB to position QA (i.e. to the ordinary position). Note that, when the rotatable mirror RM1 is in position QB, the optical viewfinder system F is subjected to a blackout.

In the fifth embodiment, it is not possible to use two systems concurrently. In exchange for this, however, it is possible to secure a sufficient amount of light for the system that is being used at a particular moment, because light is delivered to only one system at a time. Moreover, since the camera body BO is constructed in the same way as those used in ordinary single-lens reflex cameras, a photographing system capable of video moving-picture and still-picture shooting as well as silver-halide shooting can be realized simply by providing cameras additionally with a removable viewfinder/video unit RFV and other components.

As described above, according to the present invention, it is possible to realize a camera that is capable of both silver-halide shooting and video shooting but that nevertheless allows its distance measurement device to be placed substantially in the same way and allows its mirror box to have substantially the same size as in ordinary single-lens reflex cameras.

Obviously, many modifications and variations of the present invention are possible in light of the above teachings. It is therefore to be understood that within the scope of the appended claims, the invention may be practiced other than as specifically described.

TABLE 1

<Combinations of Mirrors and Systems>

| No. | Optical System Arrangement P1 | P2, P2' | Mirror Function M1 | M2 | Light Amount | Simultaneous Use of System VG | FV | FG | Focusing Screen | Remarks |
|---|---|---|---|---|---|---|---|---|---|---|
| 1 | V | F, G | Splitting | Splitting | x | ○ | ○ | ○ | ○ | For Comparison |
| 2 |   |   | Splitting | Switching | ○ | ○ | ○ | x | ○ | Emb. 3 |
| 3 |   |   | Switching | Splitting | ○ | x | x | ○ | ○ |   |
| 4 |   |   | Switching | Switching | ○ | x | x | x | ○ |   |
| 5 | F | G, V | Splitting | Splitting | x | ○ | ○ | ○ | ○ | For Comparison |
| 6 |   |   | Splitting | Switching | ○ | x | ○ | ○ | ○ |   |
| 7 |   |   | Switching | Splitting | ○ | ○ | x | x | ○ | Emb. 4 |
| 8 |   |   | Switching | Switching | ○ | x | x | x | ○ |   |
| 9 | G | V, F | Splitting | Splitting | x | ○ | ○ | ○ | Δ | For Comparison |
| 10 |   |   | Splitting | Switching | ○ | ○ | x | ○ | Δ | Emb. 1, 2 |
| 11 |   |   | Switching | Splitting | ○ | x | ○ | x | Δ |   |
| 12 |   |   | Switching | Switching | ○ | x | x | x | Δ | Emb. 5 |

TABLE 2

<Emb. 1, Type No. 10>

| Shooting Mode SO | Position of Mirror RM (M2) | Object-Observation System EVF | OVF | Video Moving-Picture Shooting | Video Still-Picture Shooting | Silver-Halide Shooting | Remarks |
|---|---|---|---|---|---|---|---|
| 1 | PB | ○ | x | ○S1 | ○S2 | ○S3 | Concurrent silver-halide and video moving-picture shooting possible. |
| 2 | PB | ○ | x | x | ○S2 or S3 |   | Simultaneous silver-halide and video still-picture shooting. |
| 3 | PA | x | ○ | x | x | ○S3 | Silver-halide shooting. |
| 4 | Normally PA, but PB during shooting | x | ○B | x | ○S2 or S3 |   | Simultaneous silver-halide and video still-picture shooting. For shooting, mirror RM (M2) makes a quick return: PA → PB → PA. |

TABLE 3

<Emb. 2, Type No. 10>

| Shooting Mode SO | Position of Mirror RM (M2) | Object-Observation System PCM | OVF | Video Moving-Picture Shooting | Video Still-Picture Shooting | Silver-Halide Shooting | Remarks |
|---|---|---|---|---|---|---|---|
| 1 | PB | ○ | x | ○P | ○P | ○S3 | Concurrent silver-halide and video moving-picture shooting possible. |
| 2 | PB | ○ | x | x | ○P or S3 |   | Simultaneous silver-halide and video still-picture shooting. |

TABLE 3-continued

<Emb. 2, Type No. 10>

| Shooting Mode SO | Position of Mirror RM (M2) | Object-Observation System PCM | Object-Observation System OVF | Video Moving-Picture Shooting | Video Still-Picture Shooting | Silver-Halide Shooting | Remarks |
|---|---|---|---|---|---|---|---|
| 3 | PA | x | ○ | x | x | ○S3 | Silver-halide shooting. |
| 4 | Normally PA, but PB during shooting | x | ○B | x | ○P or S3 | | Simultaneous silver-halide and video still-picture shooting. For shooting, mirror RM (M2) makes a quick return: PA → PB → PA. |

TABLE 4

<Emb. 3, Type No. 2>

| Shooting Mode SO | Position of Mirror RM (M2) | Object-Observation System EVF | Object-Observation System OVF | Video Moving-Picture Shooting | Video Still-Picture Shooting | Silver-Halide Shooting | Remarks |
|---|---|---|---|---|---|---|---|
| 1 | Normally PA, but PB during shooting | ○ | ○B | ○S1 | ○S2 | ○S3 | Concurrent silver-halide and video moving-picture shooting possible. For shooting, mirror RM (M2) makes a quick return: PA → PB → PA. |
| 2 | Normally PA, but PB during shooting | ○ | ○B | x | ○S2 or S3 | | Simultaneous silver-halide and video still-picture shooting. For shooting, mirror RM (M2) makes a quick return: PA → PB → PA. |
| 3 | Normally PA, but PB during shooting | x | ○B | ○S1 | ○S2 | ○S3 | Concurrent silver-halide and video moving-picture shooting possible. For shooting, mirror RM (M2) makes a quick return: PA → PB → PA. |
| 4 | Normally PA, but PB during shooting | x | ○B | x | ○S2 or S3 | | Simultaneous silver-halide and video still-picture shooting. For shooting, mirror RM (M2) makes a quick return: PA → PB → PA. |
| 5 | PB | ○ | x | ○S1 | ○S2 | ○S3 | Concurrent silver-halide and video moving-picture shooting possible. |
| 6 | PB | ○ | x | x | ○S2 or S3 | | Simultaneous silver-halide and video still-picture shooting. |

TABLE 5

<Emb. 4, Type No. 7>

| Shooting Mode SO | Position of Mirror RM (M1) | Object-Observation System EVF | Object-Observation System OVF | Video Moving-Picture Shooting | Video Still-Picture Shooting | Silver-Halide Shooting | Remarks |
|---|---|---|---|---|---|---|---|
| 1 | PB | o | x | oS1 | oS2 | oS3 | Concurrent silver-halide and video moving-picture shooting possible. |
| 2 | PB | o | x | x | oS2 or S3 | | Simultaneous silver-halide and video still-picture shooting. |
| 3 | Normally PA, but PB during shooting | x | oB | x | oS2 | oS3 | For shooting, mirror RM (M1) makes a quick return: PA → PB → PA. |
| 4 | Normally PA, but PB during shooting | x | oB | x | oS2 or S3 | | Simultaneous silver-halide and video still-picture shooting. For shooting, mirror RM (M1) makes a quick return: PA → PB → PA. |

TABLE 6

<Emb. 5, Type No. 12>

| Shooting Mode SO | Position of Mirror RM1 (M1) | Position of Mirror RM2 (M2) | Object-Observation System PCM | Object-Observation System OVF | Video Moving-Picture Shooting | Video Still-Picture Shooting | Silver-Halide Shooting | Remarks |
|---|---|---|---|---|---|---|---|---|
| 1 | QA | PB | o | x | oP | oP | x | Video shooting. |
| 2 | QA | Normally PA, but PB during shooting | x | oB | x | oP | x | For shooting, mirror RM2 makes a quick return: PA → PB → PA. |
| 3 | Normally QA, but QB during shooting | PB | oB | x | x | x | oS3 | For shooting, mirror RM1 makes a quick return: QA → QB → QA. |
| 4 | Normally QA, but QB during shooting | PA | x | oB | x | x | oS3 | For shooting, mirror RM1 makes a quick return: QA → QB → QA. |

What is claimed is:

1. A camera comprising, a switching member for switching a subsequent path of a light flux having passed through a taking lens between a direction in which the light flux continues to travel as a first light flux and another direction in which the light flux continues to travel as a second light flux;

a light flux splitting member for splitting said second light flux into a third light flux and a fourth light flux;

a first shooting system that performs shooting by receiving one of said first, third, and fourth light fluxes;

a second shooting system that performs shooting by receiving one of said first, third, and fourth light fluxes except the one that is directed to said first shooting system; and a viewfinder optical system that receives one of said first, third, and fourth light fluxes except the ones that are directed to said first and second shooting systems.

2. A camera as claimed in claim 1, wherein said light flux splitting member is a half mirror.

3. A camera as claimed in claim 1, wherein said switching member is a mirror that is disposed movably so that it can switch a path of a light flux.

4. A camera as claimed in claim 1, wherein said first and second shooting systems include a shooting system that records object images on silver-halide film and a shooting system that electronically records object images.

5. A camera comprising, a first switching member for switching a subsequent path of a light flux having passed through a taking lens between a direction in which the light flux continues to travel as a first light flux and another direction in which the light flux continues to travel as a second light flux;

a second switching member for switching a subsequent path of said second light flux between a direction in which the second light flux continues to travel as a third light flux and another direction in which the second light flux continues to travel as a fourth light flux;

a first shooting system that performs shooting by receiving one of said first, third, and fourth light fluxes;

a second shooting system that performs shooting by receiving one of said first, third, and fourth light fluxes except the one that is directed to said first shooting system; and a viewfinder optical system that receives one of said first, third, and fourth light fluxes except the ones that are directed to said first and second shooting systems.

6. A camera as claimed in claim 5, wherein said first or second switching member is a mirror that is disposed movably so that it can switch a path of a light flux.

7. A camera as claimed in claim 5, wherein said first and second shooting systems include a shooting system that records object images on silver-halide film and a shooting system that electronically records object images.

* * * * *